(12) United States Patent
Fischer et al.

(10) Patent No.: US 6,237,016 B1
(45) Date of Patent: *May 22, 2001

(54) METHOD AND APPARATUS FOR MULTIPLYING AND ACCUMULATING DATA SAMPLES AND COMPLEX COEFFICIENTS

(75) Inventors: Stephen A. Fischer, Rancho Cordova; Larry M. Mennemeier, Boulder Creek, both of CA (US); Alexander D. Peleg, Haifa (IL); Carole Dulong, Saratoga, CA (US); Eiichi Kowashi, Ibaraki (JP)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/905,506

(22) Filed: Jul. 31, 1997

Related U.S. Application Data

(60) Division of application No. 08/575,778, filed on Dec. 20, 1995, now Pat. No. 6,058,408, which is a continuation-in-part of application No. 08/523,386, filed on Sep. 5, 1995, now abandoned.

(51) Int. Cl.$^7$ .............................. G06F 7/52; G06F 17/10
(52) U.S. Cl. ............................................ 708/622; 708/300
(58) Field of Search ......................... 364/754.03, 748.17; 708/622, 511

(56) References Cited

U.S. PATENT DOCUMENTS

| | | | |
|---|---|---|---|
| 3,641,736 | 2/1972 | Amdahl et al. | 364/736 |
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,344,151 | 8/1982 | White | 364/754 |
| 4,393,468 | 7/1983 | New | 364/736 |
| 4,418,383 | 11/1983 | Doyle et al. | 364/200 |

(List continued on next page.)

OTHER PUBLICATIONS

J. Shipnes, Graphics Processing with the 88110 RISC Microprocessor, IEEE (1992), pp. 169–174.

(List continued on next page.)

*Primary Examiner*—Tan V. Mai
(74) *Attorney, Agent, or Firm*—Blakely, Sokoloff, Taylor & Zafman LLP

(57) ABSTRACT

A method and apparatus for performing complex digital filters. According to one aspect of the invention, a method for performing a complex digital filter is described. The complex digital filter is performed using a set of data samples and a set of complex coefficients. In addition, the complex digital filter is performed using a inner and outer loop. The outer loop steps through a number of corresponding relationships between the set of complex coefficients and the set of data samples. The inner loop steps thorough each complex coefficient in the set of complex coefficients. Within the inner loop, the data sample corresponding to the current complex coefficient (the complex coefficient currently identified by the inner loop) is determined according to the current corresponding relationship (the corresponding relationship currently identified by the outer loop). Then, in response to receiving an instruction, eight data elements are read and used to generate a currently calculated complex number. These eight data elements were previously stored as packed data and include two representations of each of the components of the current complex coefficient and its current corresponding data sample. Each of these data elements is either the positive or negative of the component they represent. As a result of the manner in which these eight data elements are stored, the currently calculated complex number represents the product of the current complex coefficient and its current corresponding data sample. The currently calculated complex number is then added to the current output packed data.

18 Claims, 11 Drawing Sheets

U.S. PATENT DOCUMENTS

| | | | |
|---|---|---|---|
| 4,498,177 | 2/1985 | Larson | 371/52 |
| 4,707,800 | 11/1987 | Montrone et al. | 364/788 |
| 4,771,379 | 9/1988 | Ando et al. | 364/200 |
| 4,779,218 | 10/1988 | Jauch | 364/736 |
| 4,989,168 | 1/1991 | Kuroda et al. | 364/715.09 |
| 5,095,457 | 3/1992 | Jeong | 364/758 |
| 5,111,422 | 5/1992 | Ullrich | 364/750.5 |
| 5,187,679 | 2/1993 | Vassiliadis et al. | 364/786 |
| 5,222,037 | 6/1993 | Taniquchi | 364/748 |
| 5,227,994 | 7/1993 | Mitsuharu | 364/750.5 |
| 5,241,492 | 8/1993 | Girardeau, Jr. | 364/736 |
| 5,243,624 | 9/1993 | Paik et al. | 375/14 |
| 5,262,976 | 11/1993 | Young et al. | 364/760 |
| 5,293,558 | 3/1994 | Narita et al. | 364/752 |
| 5,321,644 | 6/1994 | Schibinger | 366/737 |
| 5,325,320 | 6/1994 | Chiu | 364/760 |
| 5,381,357 | 1/1995 | Wedgewood et al. | 364/724.16 |
| 5,420,815 | 5/1995 | Nix et al. | 364/750.5 |
| 5,441,799 | 8/1995 | Murakami et al. | 395/800 |
| 5,457,805 | 10/1995 | Nakamura | 395/800 |
| 5,473,557 | 12/1995 | Harrison et al. | 364/736 |
| 5,487,022 | 1/1996 | Simpson et al. | 364/715.04 |
| 5,500,811 | 3/1996 | Corry | 364/724.16 |
| 5,506,865 | 4/1996 | Weaver, Jr. | 370/335 |
| 5,509,129 | 4/1996 | Guttag et al. | 395/379 |
| 5,517,438 | 5/1996 | Dao-Troung et al. | 364/748 |
| 5,528,529 | 6/1996 | Seal | 364/736 |
| 5,566,101 | 10/1996 | Kodra | 364/724.16 |
| 5,576,983 | 11/1996 | Shiokawa | 364/754 |
| 5,675,526 | 10/1997 | Peleg et al. | |
| 5,677,862 | 10/1997 | Peleg et al. | |
| 5,742,538 * | 4/1998 | Guttag et al. | 708/628 |
| 5,896,543 * | 4/1999 | Garde | 708/524 |

OTHER PUBLICATIONS

MC88110 Second Generation RISC Microprocessor User's Manual, Motorola Inc. (1991).

Errata to MC88110 Second Generation RISC Microprocessor User's Manual, Motorola Inc. (1992), pp. 1–11.

MC88110 Programmer's Reference Guide, Motorola Inc. (1992), p 1–4.

i860™ Microprocessor Family Programmer's Reference Manual, Intel Corporation (1992), Ch. 1, 3, 8, 12.

R.B. Lee, Accelerating Multimedia With Enhanced Microprocessors, IEEE Micro (Apr. 1995), pp 22–32.

TMS320C2x User's Guide, Texas Instruments (1993) pp 3–2 through 3–11; 3–28 through 3–34; 4–1 through 4–22; 4–41; 4–103; 4–119 through 4–120; 4–122; 4–150 through 4–151.

L. Gwennap, New PA–RISC Processor Decodes MPEG Video, Microprocessor Report (Jan. 1994), pp. 16, 17.

SPARC Technology Business, UltraSPARC Multimedia Capabilities On–Chip Support for Real–Time Video and Advanced Graphics, Sun Microsystems (Sep. 1994).

Y. Kawakami et al., LSI Applications: A Single–Chip Digital Signal Processor for Voiceband Applications, Solid State Circuits Conference, Digest of Technical Papers; IEEE International (1980).

B. Case, Philips Hopes to Displace DSPs with VLIW, Microprocessor Report (Dec. 94), pp. 12–15.

L. Gwennap, UltraSparc Adds Multimedia Instructions, Microprocessor Report (Dec. 94), pp 16–18.

N. Margulis, i860 Microprocessor Architecture, McGraw Hill, Inc. (1990) Ch. 6, 7, 8, 10, 11.

Pentium Processor User's Manual, vol. 3: Architecture and Programming Manual, Intel Corporation (1993), Ch. 1, 3, 4, 6, 8, and 18.

Desktop Video Data Handbook, Philips Semiconductors (1993), pp iii–v and 3–311 through 3–319.

Jack, K., Video Demystified, A Handbook for the Digital Engineer, (1955), pp. vii–x and 197–256.

* cited by examiner

METHOD AND APPARATUS FOR MULTIPLYING AND ACCUMULATING DATA SAMPLES AND COMPLEX COEFFICIENTS

This is a divisional of application Ser. No. 08/575,778, filed Dec. 20, 1995, U.S. Pat. No. 6,058,408.

This is a continuation-in-part of application Ser. No. 08/523,386, filed on Sep. 5, 1995, that is abandoned.

BACKGROUND OF THE INVENTION

1. Field of the Invention

The invention relates to the field of computer systems. More specifically, the invention relates to operations on complex numbers.

2. Background Information

Many devices in use today (e.g., modems, radar, TV, telephone, etc.) transmit data using in phase and out of phase signals (e.g., orthogonal signals). This data is typically processed using complex numbers (e.g., the real number is used for the in phase signal, while the imaginary number is used for the out of phase signal). The multiplication of two complex number (e.g., $r_1\ i_1$ and $r_2\ i_2$) is performed according to Equation 1 shown below.

Real Component=$r_1 \cdot r_2 - i_1 \cdot i_2$

Imaginary Component=$r_1 \cdot i_2 + r_2 \cdot i_1$     Equation 1

The multiplication of complex numbers is required in operations such as, the multiply-accumulate operation (see Equation 2 below). In Equation 2, a(n) and b(n) represent the $n^{th}$ complex numbers in two series of complex numbers.

$y(n)=y(n-1)+a(n) * b(n)$     Equation 2

Digital discrete time filters, such as a FIR filter and an IIR filter, require many multiply-accumulate operations. A FIR filter is an operation which is used in applications, such as real time digital signal processing applications (e.g., complex demodulation and equalization found in high speed data modems; ghost canceling in terrestrial broadcasting), for recovery of the transmitted information from the signal. The equation for the FIR filter is shown below as Equation 3.

$$y(k) = \sum_{n=0}^{L-1} c(n) * x(k-n) \quad \text{Equation 3}$$

With reference to Equation 3, the complex variable y(k) represents the current output sample of the filter, the input value c(n) represents the $n^{th}$ filter coefficient of the filter, the constant L is the number of coefficients in c(n), and the input value x(k−n) represents the $n^{th}$ past value of the input sequence (also termed as "samples"). The output of the filter is a weighted average of the past L complex samples.

Typically, there are more samples than there are coefficients. For the computation of the $k^{th}$ output sample y(k), the first complex coefficient corresponds to the $k^{th}$ sample, the second corresponds to the $(k-1)^{th}$ sample, and so on. Each complex coefficient is multiplied by the sample to which it corresponds, and these products are accumulated to generate the $k^{th}$ output sample of the filter. For the computation of the $(k+1)^{th}$ output sample y(k+1), the first complex coefficient corresponds to the $(k+1)^{th}$ sample, the second complex coefficient corresponds to the $k^{th}$ sample, and so on. Each complex coefficient is multiplied by the sample to which it corresponds, and these products are accumulated to generate the $(k+1)^{th}$ output of the filter. Thus, the correspondence between the samples and the complex coefficients is slide up one for each successive output sample. As a result, FIR filters are typically coded using an outer and an inner loop. The outer loop steps through the successive outputs (the different corresponding relationships between the samples and complex coefficients), while the inner loop steps through the complex coefficients and current corresponding samples to perform the multiply-accumulate.

When a FIR filter is first begun, there are insufficient samples to compute the entire length (L) of the filter (i.e., index k−n into the input samples x() is negative). In such situations, the missing samples are typically substituted with zero, the first sample, or some other relevant input.

The equation for the IIR filter is shown below as Equation 4.

$$y(k) = \sum_{n=0}^{L-1} c(n) * x(k-n) + \sum_{i=0}^{M-1} d(i) * y(k-i) \quad \text{Equation 4}$$

With reference to Equation 4, the input value d(i) represents the $i^{th}$ filter coefficient of the filter, and the constant M is the number of coefficients in d(i).

One prior art technique for supporting multiply-accumulate operations is to couple a separate digital signaling processor (DSP) to an existing general purpose processor (e.g., The Intel® 486 manufactured by Intel Corporation of Santa Clara, Calif.). The general purpose processor allocates jobs to the DSP.

One such prior art DSP is the TMS320C2x DSP manufactured by Texas Instruments, Inc. of Dallas, Tex.). A prior art method for performing a complex multiply-accumulate operation on this DSP is to perform the multiply and add operations to generate the real component and add that real component to an accumulation value representing the accumulated real component, and then perform the multiply and add operations to generate the imaginary component and add that imaginary component to an accumulation value representing the accumulated imaginary component. A pseudo code representation of the inner loop of the FIR filter is shown below in Table 1.

TABLE 1

| | | |
|---|---|---|
| ZAC | | ;ACC <= 0, other setup code to initialize pointers |
| YRSTART | | ;Loop label |
| LT | *x++ | ;T <= x.i(n) |
| MPY | *c++ | ;P <= T* c.i(n) |
| LT | *x++ | ;T <= x.r(n) |
| MPYS | *c++ | ;ACC <= ACC - P,P <= T* c.r(n) |
| APAC | 1c-- | ;ACC <= ACC + P, decrement loop counter register |
| BANZ | YRSTART | ;Jump back to beginning of loop if 1c is not zero |
| SA | *y++ | ;Store y.r |

TABLE 1-continued

| | | |
|---|---|---|
| ZAC | | ;ACC <= 0, reset the pointers here. |
| YISTART | | |
| LT | *x++ | ;T <= x.i(n) |
| MPY | *c++ | ;P <= T* c.r(n) |
| LT | *x++ | ;T <= x.r(n) |
| MPYA | *c++ | ;ACC <= ACC + P,P <= T*c.i(n) |
| APAC | 1c-- | ;ACC <= ACC + P |
| BANZ | YISTART | |
| SA | *y | |

One limitation of the TMS320C2x DSP is its limited efficiency when performing complex number multiplication and FIR filters. As illustrated by the above pseudo code, the algorithm is basically serial in nature. Thus, it requires approximately 10 instructions to accumulate the result of multiplying together two complex numbers.

Multimedia applications (e.g., applications targeted at computer supported cooperation (CSC—the integration of teleconferencing with mixed media data manipulation), 2D/3D graphics, image processing, video compression/decompression, recognition algorithms and audio manipulation) require the manipulation of large amounts of data which may be represented in a small number of bits. For example, graphical data typically requires 16 bits and sound data typically requires 8 bits. Each of these multimedia application requires one or more algorithms, each requiring a number of operations. For example, an algorithm may require an add, compare and shift operations.

To improve efficiency of multimedia applications (as well as other applications that have the same characteristics), prior art processors provide packed data formats. A packed data format is one in which the bits typically used to represent a single value are broken into a number of fixed sized data elements, each of which represents a separate value. For example, a 64-bit register may be broken into two 32-bit elements, each of which represents a separate 32-bit value. In addition, these prior art processors provide instructions for separately manipulating each element in these packed data types in parallel. For example, a packed add instruction adds together corresponding data elements from a first packed data item and a second packed data item. Thus, if a multimedia algorithm requires a loop containing five operations that must be performed on a large number of data elements, it is desirable to pack the data and perform these operations in parallel using packed data instructions. In this manner, these processors can more efficiently process multimedia applications.

However, if the loop of operations contains an operation that cannot be performed by the processor on packed data (i.e., the processor lacks the appropriate instruction), the data will have to be unpacked to perform the operation. For example, if the multimedia algorithm requires an add operation and the previously described packed add instruction is not available, the programmer must unpack both the first packed data item and the second packed data item (i.e., separate the elements comprising both the first packed data item and the second packed data item), add the separated elements together individually, and then pack the results into a packed result for further packed processing. The processing time required to perform such packing and unpacking often negates the performance advantage for which packed data formats are provided. Therefore, it is desirable to incorporate in a computer system a set of packed data instructions that provide all the required operations for typical multimedia algorithms. However, due to the limited die area on today's general purpose microprocessors, the number of instructions which may be added is limited. Therefore, it is desirable to invent instructions that provide both versatility (i.e. instructions which may be used in a wide variety of multimedia algorithms) and the greatest performance advantage.

SUMMARY

The invention provides a method and apparatus for performing complex digital filters is described. According to one aspect of the invention, a method for performing a complex digital filter is described. The complex digital filter is performed using a set of data samples and a set of complex coefficients. In addition, the complex digital filter is performed using a inner and outer loop. The outer loop steps through a number of corresponding relationships between the set of complex coefficients and the set of data samples. Each of these corresponding relationships is used by the digital filter to generate an output which is stored in the form of a packed data item. Each output packed data item has a first and second data element respectively storing the real and imaginary components of the filter's complex output. The inner loop steps thorough each complex coefficient in the set of complex coefficients. Within the inner loop, the data sample corresponding to the current complex coefficient (the complex coefficient currently identified by the inner loop) is determined according to the current corresponding relationship (the corresponding relationship currently identified by the outer loop). Then, in response to receiving an instruction, eight data elements are read and used to generate a currently calculated complex number. These eight data elements were previously stored as packed data and include two representations of each of the components of the current complex coefficient and its current corresponding data sample. Each of these data elements is either the positive or negative of the component they represent. As a result of the manner in which these eight data elements are stored, the currently calculated complex number represents the product of the current complex coefficient and its current corresponding data sample. The currently calculated complex number is then added to the current output packed data. As a result, the current output packed data stores the sum of the complex numbers generated in the current inner loop. According to another aspect of the invention, a machine-readable medium is described. This machine-readable medium has stored thereon data representing sequences of instructions which, when executed by a processor, cause that processor to perform the above described method.

According to another aspect of the invention, a method for updating complex coefficients used in a digital filter is described. This updating is performed using a set of complex data, a set of complex coefficients, an error distance, and a rate of convergence. A loop is implemented to step thorough each complex coefficient in the set of complex coefficients. Within the loop, the complex data sample corresponding to the current complex coefficient (the complex coefficient currently identified by the inner loop) is determined. In addition, a instruction is executed that causes eight data elements to be read and used to generate a currently calculated complex number. These eight data elements were previously stored as packed data and include two representations of each of the components of the error distance and the current corresponding complex data sample. Each of these data elements is either the positive or negative of the component they represent. As a result of the manner in which these eight data elements are stored, the currently calculated complex number represents the product of the error distance and the complex conjugate of the current corresponding data sample. The real and imaginary components of the currently calculated complex number are then shifted right by the rate of convergence to generate a current complex factor. The real and imaginary components of this current complex factor are subtracted from the respective real and imaginary components of the current complex coefficient to generate the updated components of the current complex coefficient.

BRIEF DESCRIPTION OF THE DRAWINGS

The invention may best be understood by referring to the following description and accompanying drawings which illustrate the invention. In the drawings.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

According to one aspect of the invention, a method and apparatus for storing complex data in formats which allow efficient complex multiplication operations to be performed and for performing such complex multiplication operations is described. In one embodiment of the invention, complex data is arranged in a manner which allows the multiplication of two complex numbers to be accomplished with one instruction. In addition, the result of this multiplication can be accumulated in a second instruction. In this manner, a multiply-accumulate operation is performed on two complex numbers in two instructions. According to another aspect of this invention, a method and apparatus for performing complex digital filters is generally described.

According to another aspect of the invention, a computer system generally having a transmitting unit, a processor, and a storage device is described. The storage device is coupled to the processor and has stored therein a routine. When executed by the processor, the routine causes the processor to perform a digital filter on unfiltered data items using complex coefficients to generate an output data stream. The transmitting unit is coupled to the processor for transmitting out of the computer system analogs signals that generated based on this output data stream. According to another aspect of the invention, a similar computer system is described. However, the storage device of this computer system has stored a digital filter routine that includes a least mean square routine for updating the set of complex coefficients used by the digital filter. According to another aspect of the invention, a computer system generally having a set of speakers, a conversion unit, a processor, and a storage device is described. The storage device is coupled to the processor and has stored therein a routine. When executed by the processor, the routine causes the processor to perform a complex digital filter on unfiltered data items, which represent mono audio signals, to generate an output data stream representing stereo audio signals with three dimensional sound displacement. The conversion unit is coupled to the speakers and the storage device to provide analog signals to the speakers for conversion into sound waves. The analog signals being generated based on the output data stream generated by the complex digital filter.

Figure 1:
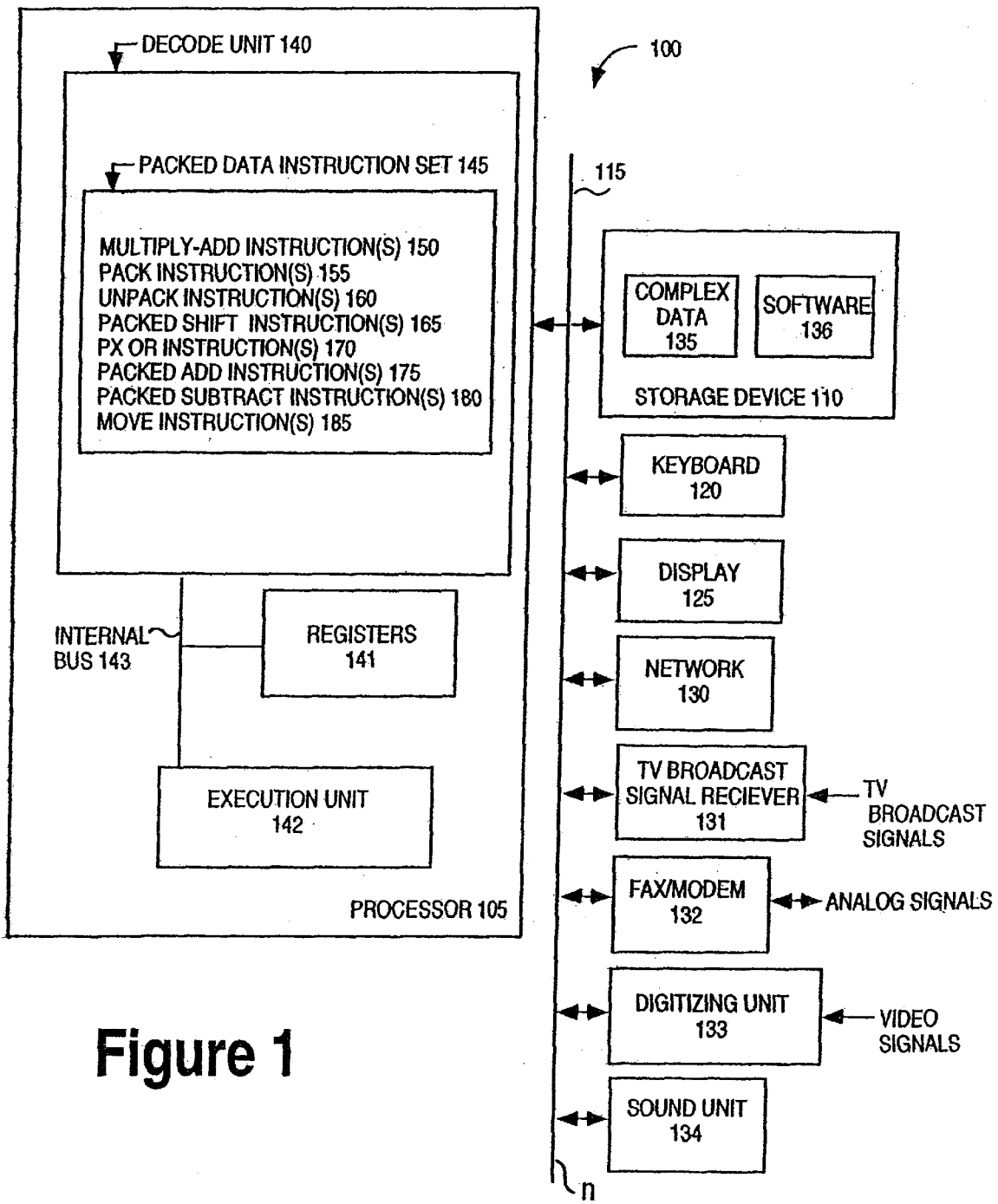
FIG. 1 shows a block diagram illustrating an exemplary computer system according to one embodiment of the invention.

FIG. 1 shows a block diagram illustrating an exemplary computer system 100 according to one embodiment of the invention. The exemplary computer system 100 includes a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as a CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more busses (e.g., PCI, ISA, X-Bus, EISA, VESA, etc.) and bridges (also termed as bus controllers). While this embodiment is described in relation to a single processor computer system, the invention could be implemented in a multi-processor computer system. In addition, while this embodiment is described in relation to a 64-bit computer system, the invention is not limited to a 64-bit computer system.

In addition to other devices, one or more of a network 130, a TV broadcast signal receiver 131, a fax/modem 132, a digitizing unit 133, and a sound unit 134 may optionally be coupled to bus 115. The network 130 represents one or more network connections (e.g., an ethernet connection). While the TV broadcast signal receiver 131 represents a device for receiving TV broadcast signals, the fax/modem 132 represents a fax and/or modem for receiving and/or transmitting analog signals representing data. As previously described, such signals often need to be filtered using a digital filter. The digitizing unit 133 represents one or more devices for digitizing images (e.g., a scanner, camera, etc.). The sound unit 134 represents one or more devices for inputting and/or outputting sound (e.g., microphones, speakers, magnetic storage devices, optical storage devices, etc.)

FIG. 1 also illustrates that the storage device 110 has stored therein complex data 135 and software 136. Complex data 135 represents data stored in one or more of the formats described herein. Software 136 represents the necessary code for performing any and/or all of the techniques described with reference to FIGS. 3, 8a, 8b, 9, and 10. Of course, the storage device 110 preferably contains additional software (not shown), which is not necessary to understanding the invention.

FIG. 1 additionally illustrates that the processor 105 includes a decode unit 140, a set of registers 141, an execution unit 142, and an internal bus 143 for executing instructions. Of course, the processor 105 contains additional circuitry, which is not necessary to understanding the invention. The decode unit 140, registers 141 and execution unit 142 are coupled together by internal bus 143. The decode unit 140 is used for decoding instructions received by processor 105 into control signals and/or microcode entry points. In response to these control signals and/or microcode entry points, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 140 is shown including packed data instruction set 145 for performing operations on packed data. In one embodiment, the packed data instruction set 145 includes the following instructions: a packed multiply-add instruction(s) (PMADD) 150, a pack instruction(s) (PACK) 155, an unpack/interleave instruction(s) (PUNPCK) 160, a packed shift instruction(s) 165, an PXOR instruction(s) (PXOR) 170, a packed add instruction(s) (PADD) 175, a packed subtract instructions) (PSUB) 180, and a move instruction(s) 185. The operation of each of these instructions is further described herein. While these packed data instructions can be implemented to perform any number of different operations, in one embodiment these packed data instructions are those described in "A Set of Instructions for Operating on Packed Data," filed on Aug. 31, 1995, Ser. No. 08/521,360. Furthermore, in one embodiment, the processor 105 is a pipelined processor (e.g., the Pentium processor) capable of completing one or more of these packed data instructions per clock cycle (ignoring any data dependencies and pipeline freezes). In addition to the packed data instructions, processor 105 can include new instructions and/or instructions similar to or the same as those found in existing general purpose processors. For example, in one embodiment the processor 105 supports an instruction set which is compatible with the Intel Architecture instruction set used by existing processors, such as the Pentium processor. Alternative embodiments of the invention may contain more or less, as well as different, packed data instructions and still utilize the teachings of the invention.

The registers 141 represent a storage area on processor 105 for storing information, including control/status information, integer data, floating point data, and packed data. It is understood that one aspect of the invention is the described instruction set for operating on packed data. According to this aspect of the invention, the storage area used for storing the packed data is not critical. The term data processing system is used herein to refer to any machine for processing data, including the computer system(s) described with reference to FIG. 1.

Figure 2B:
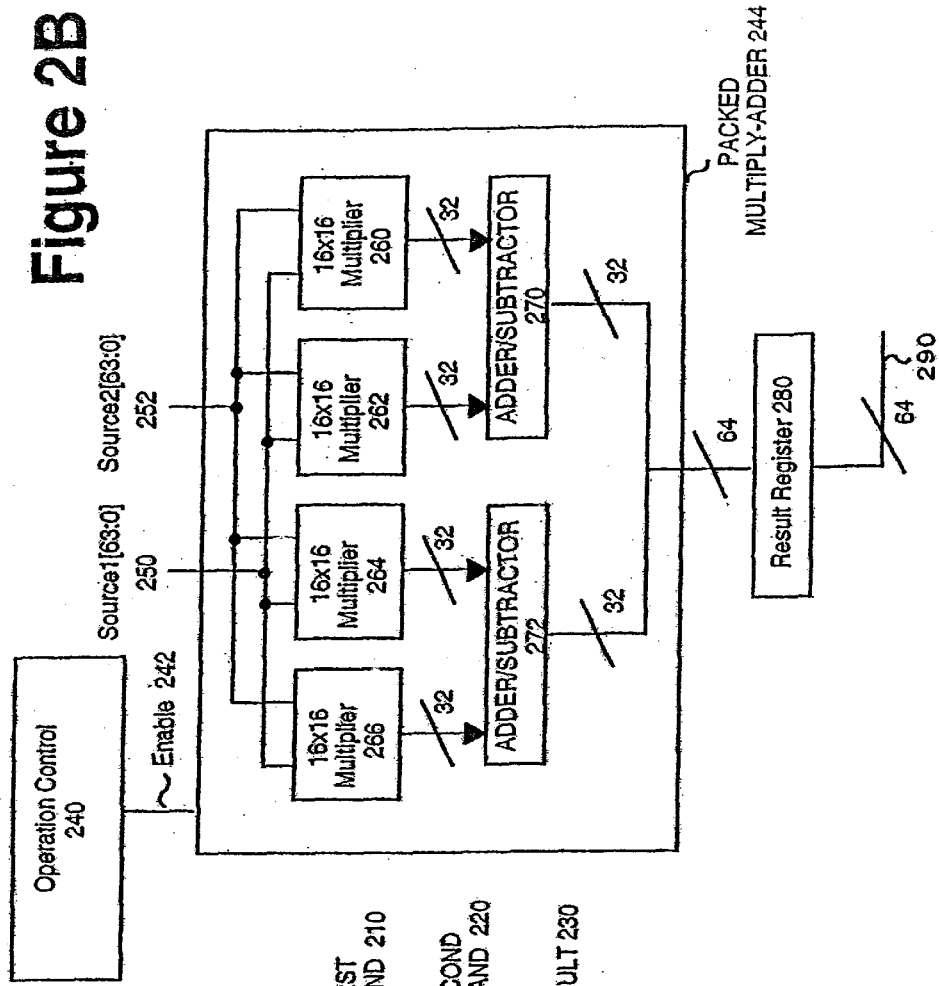
FIGS. 2A–2B illustrate the operation of the packed multiply-add instruction according to one embodiment of the present invention.
Figure 2A:
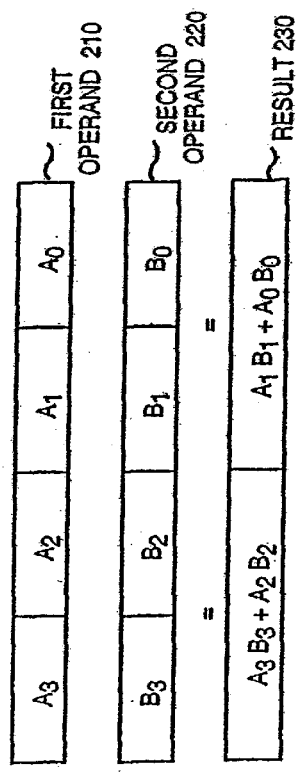

FIG. 2A illustrates the operation of the packed multiply-add instruction according to one embodiment of the present invention. FIG. 2A shows, in a simplified format, the operation of the multiply-add instruction on a first operand 210 and a second operand 220. The term operand is interchangeably used herein to refer to the data on which an instruction operates or the storage area (e.g., register, memory location, etc.) in which that data can be found. The first operand 210 is packed data item containing $A_3, A_2, A_1,$ and $A_0$ as its data elements, while the second operand 220 is packed data item containing $B_3, B_2, B_1,$ and $B_0$ as it data elements. The described embodiment of the multiply-add instruction multiplies together corresponding data elements of the first and second operands generating four intermediate results (e.g., $A_3B_3, A_2B_2, A_1B_1,$ and $A_0B_0$). These intermediate results are summed by pairs producing two results (e.g., $A_3B_3+A_2B_2$ and $A_1B_1+A_0B_0$) that are packed into their respective elements of a result 230. Thus, the result 230 is packed data item including a first data element storing $A_3B_3+A_2B_2$ and a second data element storing $A_1B_1+A_0B_0$. Thus, the described embodiment of the multiply-add instruction performs, in parallel, two "multiply-add operations". In one embodiment, each data element of the first and second operands contains 16-bits, while each intermediate result and each data element in the result 230 contains 32-bits. This increase in the number of bits allows for increased precision.

FIG. 2B illustrates a circuit for the multiply-add instruction according to one embodiment of the invention. A control unit 240 processes the control signal for the multiply-add instruction. The control unit 240 outputs signals on an enable line 242 to control a packed multiply-adder 244.

The packed multiply-adder 244 has the following inputs: a first operand 250 having bits [63:0], a second source operand 252 having bits [63:0], and the enable line 242. The packed multiply-adder 244 includes four 16×16 multiplier circuits: a first multiplier 260, a second multiplier 262, a third multiplier 264 and a fourth multiplier 266. The first multiplier 260 has as inputs bits [15:0] of the first and second operands. The second multiplier 262 has as inputs bits [31:16] of the first and second operands. The third multiplier 264 has as inputs bits [47:32] of the first and second operands. The fourth multiplier 266 has as inputs bits [63:48] of the first and second operands.

The 32-bit intermediate results generated by the first multiplier 260 and the second multiplier 262 are received by a first adder 270, while the 32-bit intermediate results generated by the third multiplier 264 and the fourth multiplier 266 are received by a second adder 272. These adders add their respective 32-bit inputs. In one embodiment, these adders are composed of four 8-bit adders with the appropriate propagation delays. However, alternative embodiments could implement these adders in any number of ways (e.g., two 32-bit adders).The output of the first adder 270 (i.e., bits [31:0] of the result) and the output of the second adder 272 (i.e., bits [63:32] of the result) are combined into the 64-bit result and communicated to a result register 280. The result is then communicated out a result bus 290 for storage in the appropriate register.

While one circuit implementation of the multiply-add instruction has been provided, alternative embodiments could implement this instruction in any number of ways. For example, alternative embodiments could use different sized multipliers (e.g., 8×16, 8×8) and include the additional adder circuitry to perform the necessary passes through the multipliers. As another example, alternative embodiments could include circuitry capable of doing only one multiply-add operation at a time. In such embodiments, the two multiply-add operations would have to be performed serially.

Figure 3:
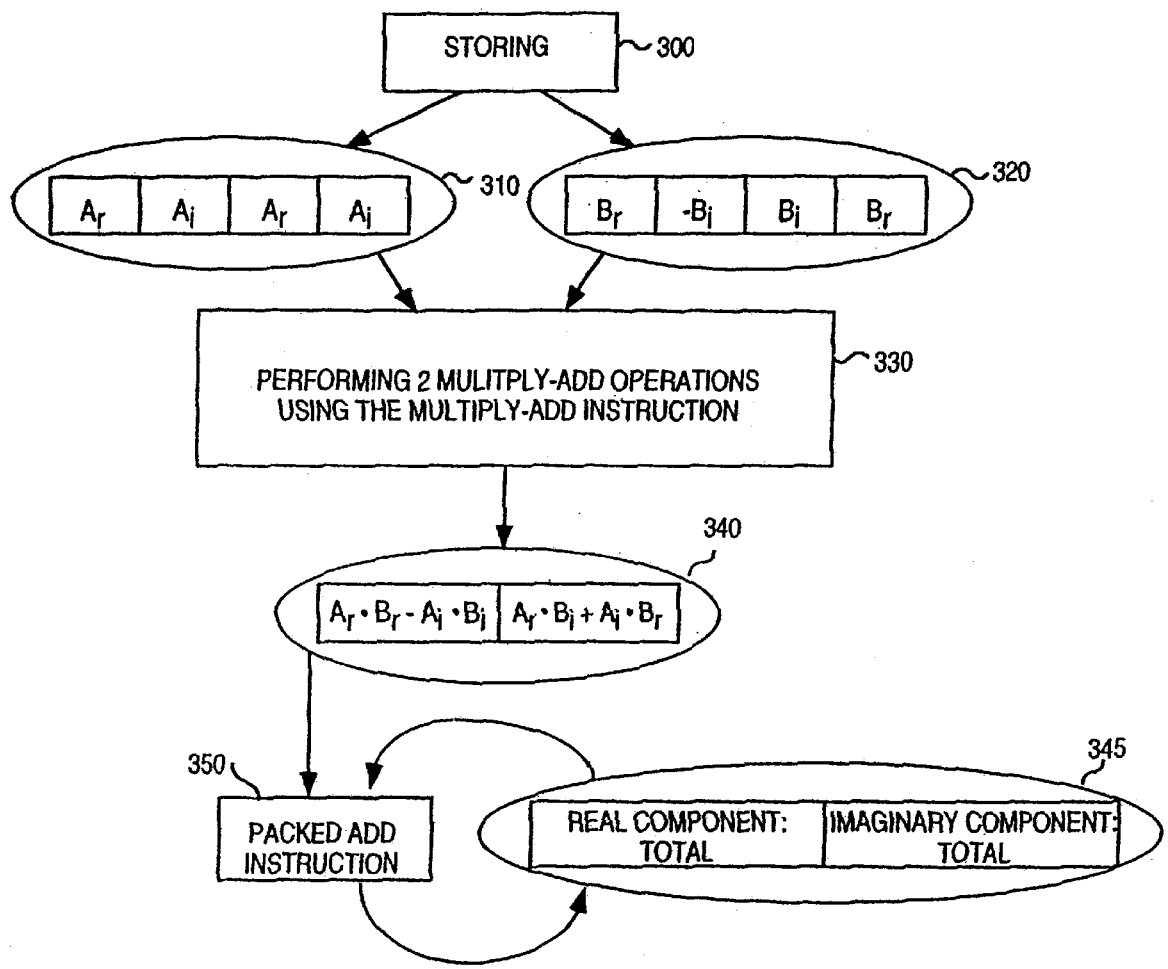
FIG. 3 illustrates a technique for performing a multiply-accumulate operation on two numbers according to one embodiment of the invention.

FIG. 3 illustrates a technique for performing a multiply-accumulate operation on two numbers according to one embodiment of the invention. In this application, data is represented by ovals, while instructions are represented by rectangles.

At step 300, a complex number A and a complex number B are stored in a first packed data item 310 and a second packed data item 320. The first packed data item 310 stores data elements representing the complex number A in a first format (such that the data elements are Ar, Ai, Ar, Ai), while the second packed data item 320 stores data elements representing the complex number B in a second format (such that the data elements are Br, −Bi, Bi, Br). Of course, one or both of these numbers could be real numbers. In such situations, the real number(s) would be stored in these complex formats by storing zero as the imaginary components. In fact, this is useful for a number of applications.

As shown by step 330, the multiply-add instruction is performed on the first packed data item 310 and the second packed data item 320 to generate a resulting packed data item 340. Thus, the multiply-add instruction causes the processor 105 to read the first packed data item 310 and the second packed data item 320, and to perform the multiply-add operations. As a result of the multiply-add instruction, the resulting packed data item contains a first data element storing ArBr−AiBi (the real component of multiplying together complex numbers A and B) and a second data element storing ArBi+AiBr (the imaginary component of multiplying together complex numbers A and B).

Thus, by arranging data representing complex numbers in the appropriate formats, the multiplication of two complex number may be performed in a single multiply-add instruction. This provides a significant performance advantage over prior art techniques of performing complex multiplication. Of course, the advantages of this invention are greater when many such complex multiplication operations are required.

FIG. 3 also shows an accumulation packed data item 345. The accumulation packed data item 345 has two 32-bit data elements. If this is the first multiply-accumulate operation, the data elements of the accumulation packed data item 345 are zero. However, if previous multiply-accumulate operations have been performed, the data elements of the accumulation packed data item 345 store the accumulation of the real and imaginary results of the previous multiply-accumulate operations.

At step 350, a packed add dword instruction is performed on the resulting packed data item 340 and the accumulation packed data item 345. The results of this packed add instruction are stored back in the data elements of the accumulation packed data item 345. If the data elements of the accumulation packed data item 345 were storing zero, the data elements now store ArBr−AiBi and ArBi+AiBr, respectively. Otherwise, the data elements now store the accumulated total of the real and imaginary component results, respectively. In this manner, the accumulation of the complex multiplication is stored.

Of course, if only the product of complex numbers is required, then step 350 and the accumulation packed data item 345 are not required.

While two formats for storing data represented as complex numbers are shown in FIG. 3, other formats allow complex multiplication to be performed in a single multiply-add instruction and are within the scope of the invention. For example, the complex data can be stored as Ar, −Ai, Ar, Ai and Br, Bi, Bi, Br. As another example, the complex data could be rearranged (e.g., formats Ar, Ai, Br, −Ai and Bi, Br, Ar, Bi). Thus, one aspect of the invention is storing data representing complex numbers in a maimer which allows complex multiplication to be performed in a single multiply-add instruction.

Alternative embodiments may employ a multiply-subtract instruction in addition to or instead of the multiply-add instruction. The multiply-subtract instruction is the same as the multiply-add operation, except the adds are replaced with subtracts. Thus, the described embodiment of the multiply-subtract instruction performs, in parallel, two "multiply-subtract operations". One circuit implementation of this instruction would be to make the first adder 270 and the second adder 272 capable of adding or subtracting. In this implementation, based on whether the current instruction is a multiply/add or multiply/subtract instruction, the first adder/subtractor 270 and the second adder/subtractor 272 would add or subtract their respective 32-bit inputs.

The multiplication of two complex numbers may also be performed in a single multiply-subtract instruction by storing the data in the appropriate formats (e.g., formats Ar, Ai, Ar, −Ai and Br, Bi, Bi, Br). Thus, another aspect of the invention is storing data representing complex numbers in formats which allow complex multiplication to be performed in a single multiply-subtract instruction. If both the multiply-add and multiply-subtract instructions are implemented, the data may be stored in formats to allow the multiply-add instruction to calculate the real components of complex multiplications (e.g., formats Ar, Ai, Cr, Ci and Br, −Bi, Dr, Di) and the multiply-subtract instruction to calculate the imaginary components of the complex multiplications (e.g., formats Ar, Ai, Cr, Ci and Bi, Br, Di, Dr). In this example, two complex numbers are respectively multiplied by two other complex numbers in parallel using two instructions. Thus, another aspect of the invention is storing data representing complex numbers in formats that allow complex multiplication to be performed efficiently by using multiply-add and multiply-subtract operations.

Of course, alternative embodiments may implement variations of these instructions. For example, alternative embodiments may include an instruction which performs at least one multiply-add operation or at least one multiply-subtract operation. As another example, alternative embodiments may include an instruction which performs at least one multiply-add operation in combination with at least one multiply-subtract operation. As another example, alternative embodiments may include an instruction which performs multiply-add operation(s) and/or multiply-subtract operation(s) in combination with some other operation.

The step 300 of storing represents a variety of ways of storing the first and second packed data items in the appropriate formats. For example, the complex data may already be stored on a CD ROM (represented by the storage device 110) in the described formats. In which case, step 300 may be performed by copying the complex data from the CD ROM into the main memory (also represented by the storage device 110), and then into registers (not shown) on the processor 105. As another example, the fax/modem 132 (see FIG. 1) connecting the computer system 100 to network 130 may receive complex data and store it in the main memory in one or more of the formats described herein—storing two representations of each of the components of the complex data such that it may be read in as packed data item in the described formats. This complex data may then be accessed as packed data and copied into registers on the processor 105. Since the data is stored in the disclosed formats, the processor 105 can easily and efficiently perform the complex multiplication (e.g., the processor 105 can access the first packed data item 310 in a single instruction). Although these formats for storing complex numbers require more storage space, the performance advantage for complex multiplication is worth the additional storage space in some situations.

If some or all of the data representing the complex numbers is stored in the storage device 110 according to the prior art format (e.g., Ar, Ai, Br, Bi), the processor 105 must rearrange this data before performing the multiply-add instruction. For example, the data may be stored on a CD ROM in the prior art format and the routine which loads it into main memory may be implemented to store it in the described formats. As another example, the modem may store (in the main memory) the complex data it receives in the prior art format. In which case, the processor 105 will need to read this complex data from main memory and rearrange it accordingly. Prearranging or rearranging the data in the above described formats can be efficiently accomplished using instructions from the packed data instruction set 145.

In one embodiment of the invention, the processor 105, executing the packed data instructions, can operate on packed data in several different packed data formats. For example, in one embodiment, packed data can be operated on in one of four formats: a "packed byte" format (e.g., PADDb), a "packed word" format (e.g., PADDw), a "packed double word" (dword) format (e.g., PADDd); or a "packed quad word" (qword) format (e.g., PADDq). The packed byte format includes eight separate 8-bit data elements; the packed word format includes four separate 16-bit data elements; the packed dword format includes two separate 32-bit data elements; and the packed quad word format includes one 64-bit data element. While certain instructions are discussed below with reference to one or two packed data formats, the instructions may be similarly applied the other packed data formats of the invention. Additionally, many of the instructions of packed data instruction set 145 can operate on signed or unsigned data and can be performed with or without "saturation". If an operation is performed using saturation, the value of the data element is clamped to a predetermined maximum or minimum value when the result of the operation exceeds the range of the data element. Exceeding the range of the data element is also referred to as data overflow or underflow. The use of saturation avoids the effects of data overflow or underflow. If the operation is performed without saturation, the data may be truncated or may indicate a data overflow or underflow in another manner.

Figure 4:
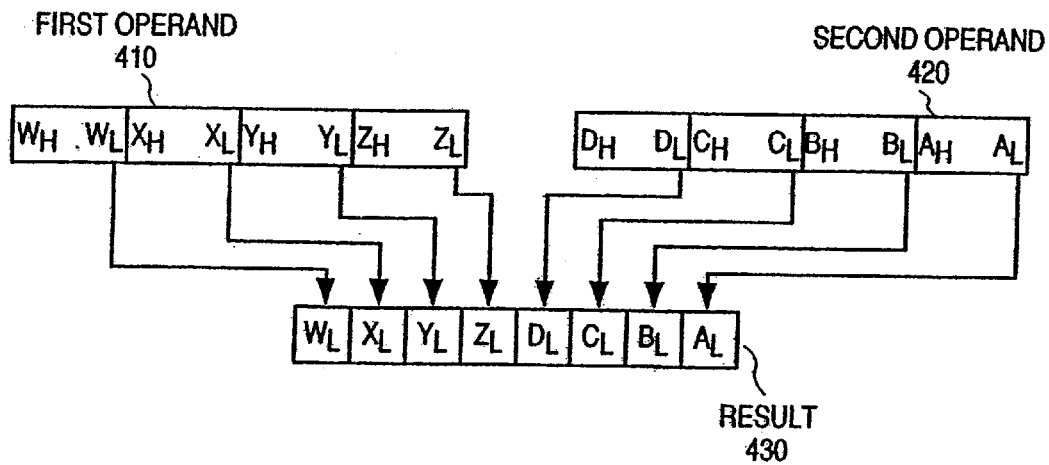
FIG. 4 illustrates the operation of a pack instruction according to one embodiment of the invention.

FIG. 4 illustrates the operation of the pack instruction according to one embodiment of the invention. In this example, the pack instruction converts data from packed words into packed bytes—the pack word instruction (PACKSSw). The low-order byte of each packed word data element in a first operand 410 are packed into the low-order bytes of a result 430 as shown. The low-order byte of each packed word data element in a second operand 420 are packed into the high-order bytes of the result 430 as shown. In an alternate embodiment, the high-order bytes of each data element in the first and second operands are packed into the result. The instruction PACKSS performs a pack operation with signed saturation.

Figure 5:
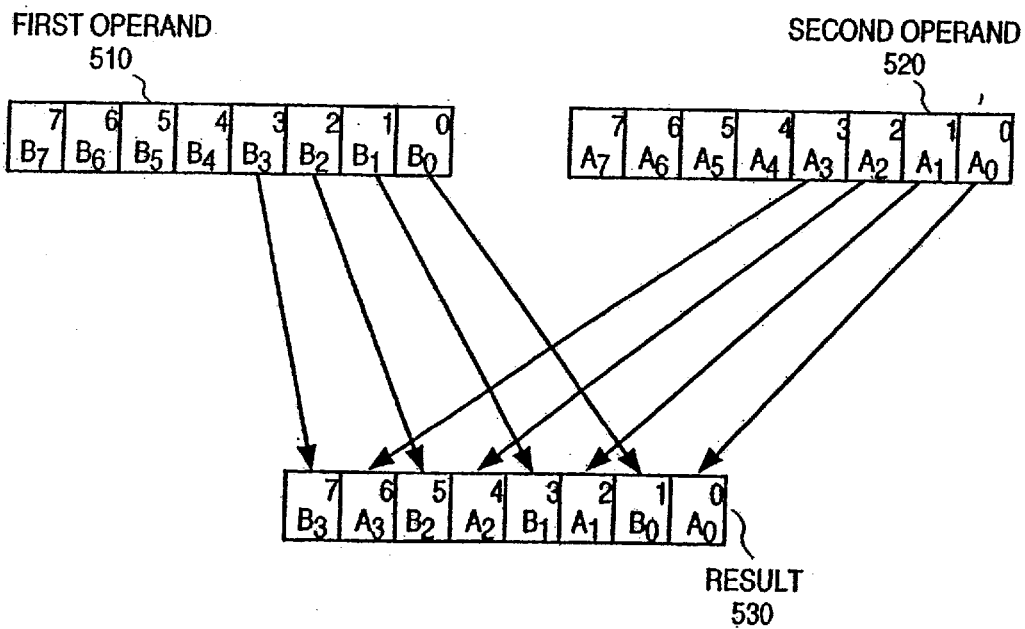
FIG. 5 illustrates the operation of an unpack instruction according to one embodiment of the invention.

FIG. 5 illustrates the operation of the unpack instruction according to one embodiment of the invention. In one embodiment, the unpack instruction interleaves the low-order data elements from a first operand 510 and a second operand 520. The numbers inside each packed data item identifies the data elements for purposes of illustration. Thus, data element 0 of the first operand 510 is stored as data element 0 of a result 530. Data element 0 of the second operand 520 is stored as data element 1 of the result 530. Data element 1 of the first operand 510 is stored as data element 2 of the result 530 and so forth, until all data elements of the result 530 store data elements from either the first operand 510 or the second operand 520. The high-order data elements of both the first and second operand are ignored. By choosing either the first operand 510 or the second operand 520 to be all zeroes, the unpack may be used to unpack packed byte data elements into packed word data elements, or to unpack packed word data elements into packed dword data elements, etc. In an alternate embodiment, the high-order bytes of each packed data item are interleaved into the result.

Figure 6:
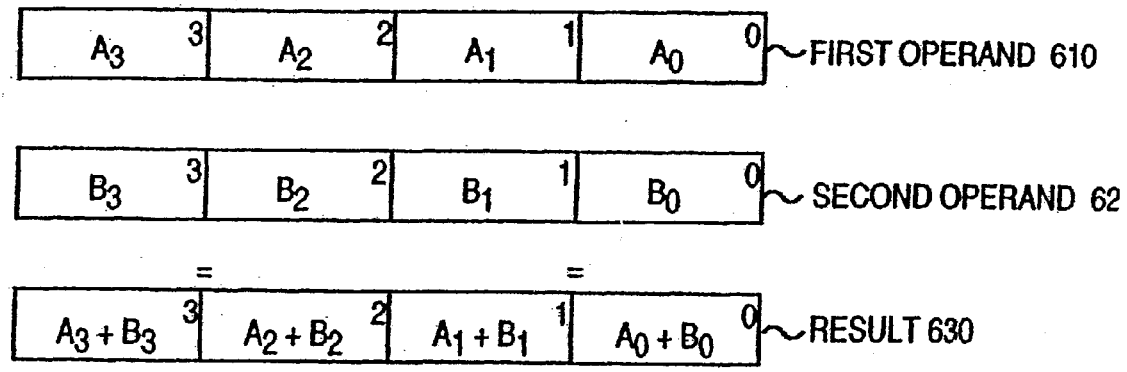
FIG. 6 illustrates the operation of a packed add instruction according to one embodiment of the invention.

FIG. 6 illustrates the operation of the packed add instruction according to one embodiment of the invention. FIG. 6 illustrates a packed add word operation (PADDw). The data elements of a first operand 610 are added to the respective packed data elements of a second operand 620 to generate a result 630. For example, data element 0 of the first operand 610 is added to data element 0 the second operand 620 and the result is stored as data element 0 of the result 630. The packed subtract instruction acts in a similar manner to the packed add instruction, except subtractions are performed.

Figure 7:
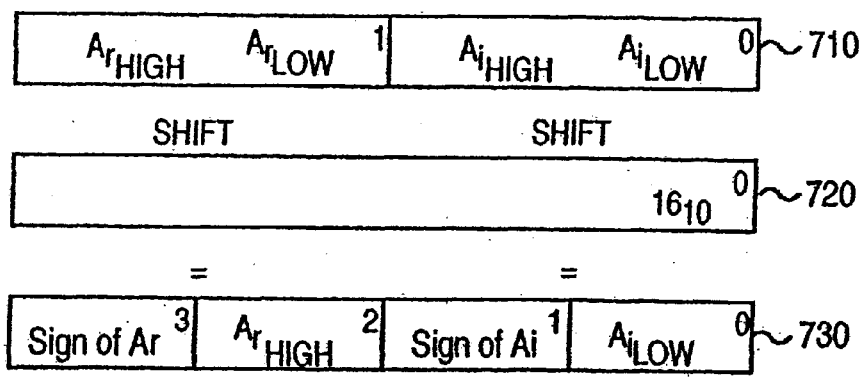
FIG. 7 illustrates the operation of a packed shift instruction according to one embodiment of the invention.

FIG. 7 illustrates the operation of a packed shift instruction according to one embodiment of the invention. One embodiment of the invention includes instructions for shifting data elements right or left and for both arithmetic and logical shifts. The shift operation shifts the bits of each individual data element by a specified number of bits in a specified direction. FIG. 7 illustrates a packed shift right arithmetic double word operation (PSRAd). FIG. 7 shows a first operand 710 having to 32-bit data elements representing Ar ($Ar_{HIGH}$ and $Ar_{LOW}$) and Ai ($Ai_{HIGH}$ and $Ai_{LOW}$), respectively. A second operand 720 stores an unsigned 64-bit scalar data element indicating the shift count In FIG. 7, the shift count value is 16 in base 10 notation. Thus, in the example shown in FIG. 7, each data element in the first operand 710 is shifted right by 16 bits to generate a result 730. Since the shift shown in FIG. 7 is arithmetic, the 16 high-order bits left open by the shift operation are filled with the initial value of the sign bit of the respective data element In contrast, a logical shift fills the high or low-order bits (depending on the direction of the shift) of the data element with zeroes. Since the shift in the illustration is to the right by 16-bits, the second operand can be logically thought of as having four 16-bit data elements—data element 2 is $Ar_{HIGH}$ and data element 0 is $Ai_{HIGH}$. In an alternative embodiment, the second operand is a packed data item in which each data element indicates a shift count by which the corresponding data element in the first operand 710 is shifted.

The PXOR instruction performs a logical exclusive OR on respective data elements from two packed data items to generate data elements in a result. Exclusive OR operations are well known in the art. Alterative embodiments also provide several other packed logical instructions, such as packed AND, OR, and ANDNOT instructions which operate in a similar manner.

The MOVQ instruction is used for moving data between the registers used for executing the packed data instructions and both memory and other registers.

For any or all of the above instructions (including the multiply-add and/or multiply-subtract instructions), alternative embodiments may also vary the number of bits in the operand data elements, intermediate results, and result data elements. In addition, alternative embodiment may vary the number of data elements used, the number of intermediate results generated, and/or the number of data elements in the result.

The instructions described herein may be implemented to access the first operand and/or the second operand from registers on the processor or from memory. In addition, these instructions may be implemented to store the results in a register on the processor and/or in memory.

Figure 8A:
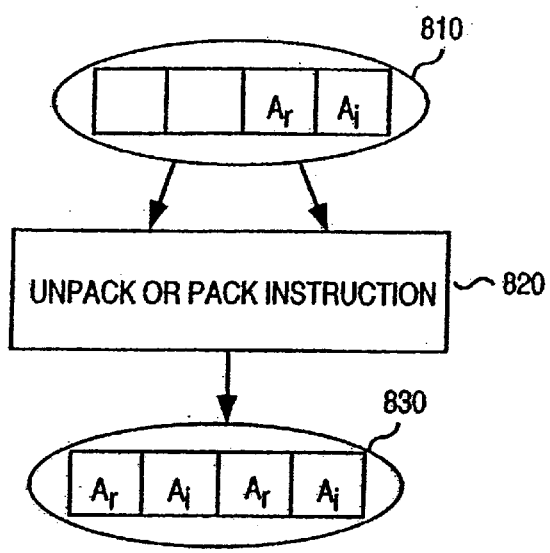
FIG. 8a illustrates a technique for storing data in one of the described formats which allows for efficient complex number multiplication according to one embodiment of the invention.
Figure 8B:
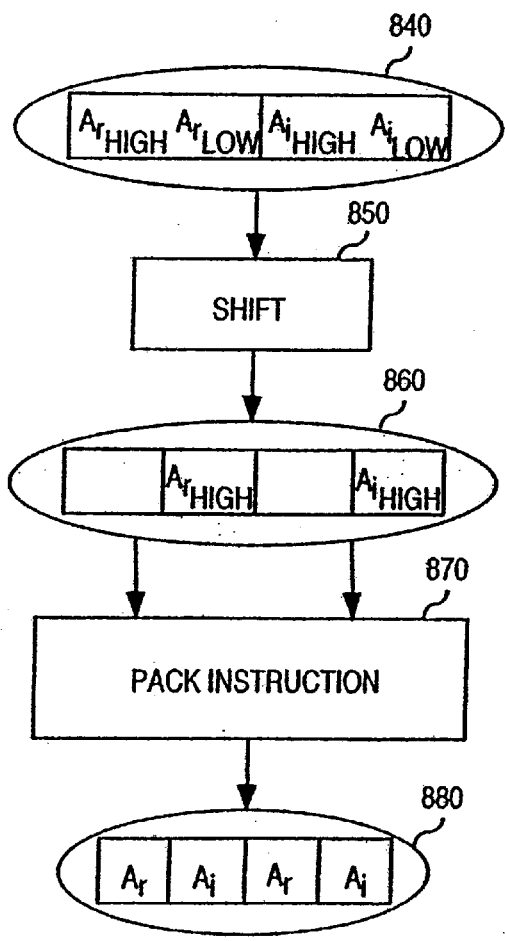
FIG. 8b illustrates a second technique for storing data in one of the described formats which allows for efficient complex number multiplication according to one embodiment of the invention.

FIGS. 8a and 8b illustrate techniques for storing data in one of the described formats which allows for efficient complex number multiplication according to one embodiment of the invention. FIG. 8a shows a first packed data item 810 storing data elements representing the complex number A. Complex number A is stored such that the data elements of the first packed data item 810 are don't care, don't care, Ar, and Ai. As shown by step 820, the first packed data item 810 is used as both operands to either the unpack dword instruction or the pack qword instruction. As a result, a third packed data item 830 is generated which contains as its data elements Ar, Ai, Ar, and Ai (i.e., the first format disclosed above).

FIG. 8b shows a first packed data item 840 storing data elements representing the complex number A. The first packed data item 840 has two data elements each containing 32-bits. The complex number A is stored such that the data elements of the first packed data item 840 are Ar and Ai, respectively. As shown by step 850, a packed shift right by 16-bits double word instruction is perform on the first packed data item 840 to generate a second packed data item 860. The second packed data item 860 has two data elements each containing 32-bits. However, the lower 16-bits of each data element contain the high order bits of Ar and Ai, respectively, while the upper 16-bits of each data element are irrelevant for this invention. Thus, the second packed data item 860 can be logically thought of as having four 16-bit data elements storing don't care, Ar, don't care, and Ai. (Of course, if it is desired to perform the complex multiplication on the lower 16-bits of the complex numbers, step 850 would be removed).

At step 870, the second packed data item 860 is used as both operands to the pack qword instruction. As a result of the pack instruction, a third packed data item 880 is generated which contains as its data elements Ar, Ai, Ar, and Ai (i.e., the first format disclosed above). Of course, if the pack instruction took the high order bits, step 850 would not be necessary and step 870 would be performed on the first packed data item 840.

Figure 9:
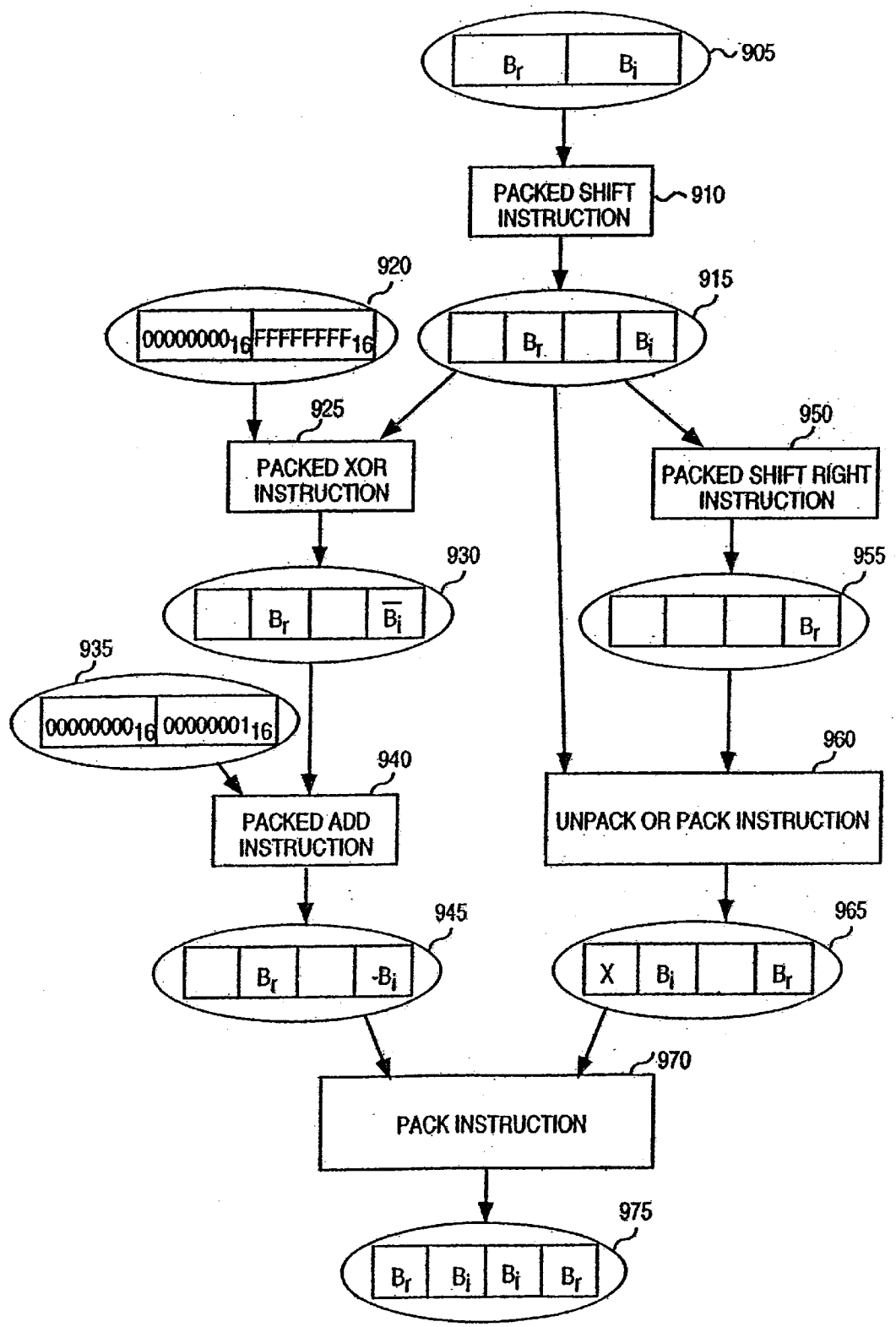
FIG. 9 illustrates a technique for storing data in another of the described formats which allow for efficient complex number multiplication according to one embodiment of the invention.

FIG. 9 illustrates a technique for storing data in another of the described formats which allow for efficient complex number multiplication according to one embodiment of the invention. FIG. 9 shows a first packed data item 905 storing data elements representing the complex number B. The first packed data item 905 has two data elements each containing 32-bits. The complex number B is stored such that the data elements of the first packed data item 905 are Br and Bi, respectively.

As shown by step 910, a packed shift right by 16-bits double word instruction is performed on the first packed data item 905 to generate a second packed data item 915. The second packed data item 915 has two data elements each containing 32-bits. However, the lower 16-bits of the data elements contain the high order bits of Br and Bi, respectively, while the upper 16-bits of the data elements are irrelevant for this invention. Thus, the second packed data item 915 can be logically thought of as having four 16-bit data elements storing don't care, Br, don't care, and Bi. (Of course, if it is desired to perform the complex multiplication on the lower 16-bits of the complex numbers, step 910 would be removed and the first packed data item 905 would replace the second packed data item 915).

FIG. 9 also shows a third packed data item 920 having two 32-bit data elements. The third packed data item 920 is used as a mask. The first data element of the third packed data item 920 is $00000000_{16}$, while the second data element is $FFFFFFFF_{16}$.

At step 925, the XOR dword instruction is performed on the second packed data item 915 and the third packed data item 920 to generate a fourth packed data item 930. The fourth packed data item has two data elements each containing 32-bits. As a result, the first data element of the fourth packed data item 930 represents Br, while the second data element represents the inverse of Bi.

FIG. 9 also shows a fifth packed data item 935 having two 32-bit data elements. The first data element of the fifth packed data item 935 is $00000000_{16}$, while the second data element is $00000001_{16}$.

At step 940, a packed add dword instruction is performed on the fourth packed data item 930 and the fifth packed data item 935 to generate a sixth packed data item 945. The sixth packed data item has two data elements each containing 32-bits. The first data element of the sixth packed data item 945 is Br, while the second data element is −Bi.

As shown in step 950, a packed shift right by 32-bits quad word instruction is performed on the second packed data item 915 to generate a seventh packed data item 955. As a result, the seventh packed data item 955 has Br stored in the lower 16-bits (data element 0).

As shown on step 960, either the unpack dword instruction or the pack qword instruction is performed on the second packed data item 915 and the seventh packed data item 955 to generate an eighth packed data item 965. As a result, the eighth packed data item 965 has four 16-bit data elements storing don't care, Bi, don't care, and Br, respectively.

As shown on step 970, a pack dword instruction is performed on the sixth packed data item 945 and the eighth packed data item 965 to generate a ninth packed data item 975. As a result, the ninth packed data item 975 contains as its data elements Br, −Bi, Bi, and Br (i.e., the second format disclosed above).

In this manner, data representing complex numbers may be placed in formats which allow complex multiplication to be performed in a single multiply-add instruction. Of course, alternative techniques may be used to store data representing complex numbers in the disclosed formats. In addition, similar techniques may be used to store data in formats amenable to embodiments which include the multiply-subtract instruction in addition to or in place of the multiply-add instruction. Furthermore, if a packed instruction is included which performs one multiply-add operation and one multiply subtract operation, then similar techniques may be used to store complex data in the appropriate formats to allows for efficient complex multiplication using this instruction.

Referring again to FIG. 3, if an additional complex number (e.g., complex number C) is to be multiplied together with the resulting packed data item 340, the complex number C and the resulting packed data item 340 can be put in the described formats. The complex number C and the resulting packed data item 340 may be placed in the appropriate packed data formats as described above with reference to FIGS. 8 and 9. For example, assuming the complex number C is stored in the second format, then the resulting packed data item 340 may be processed as shown in FIG. 8b and a multiply-add instruction may be performed.

Figure 10:
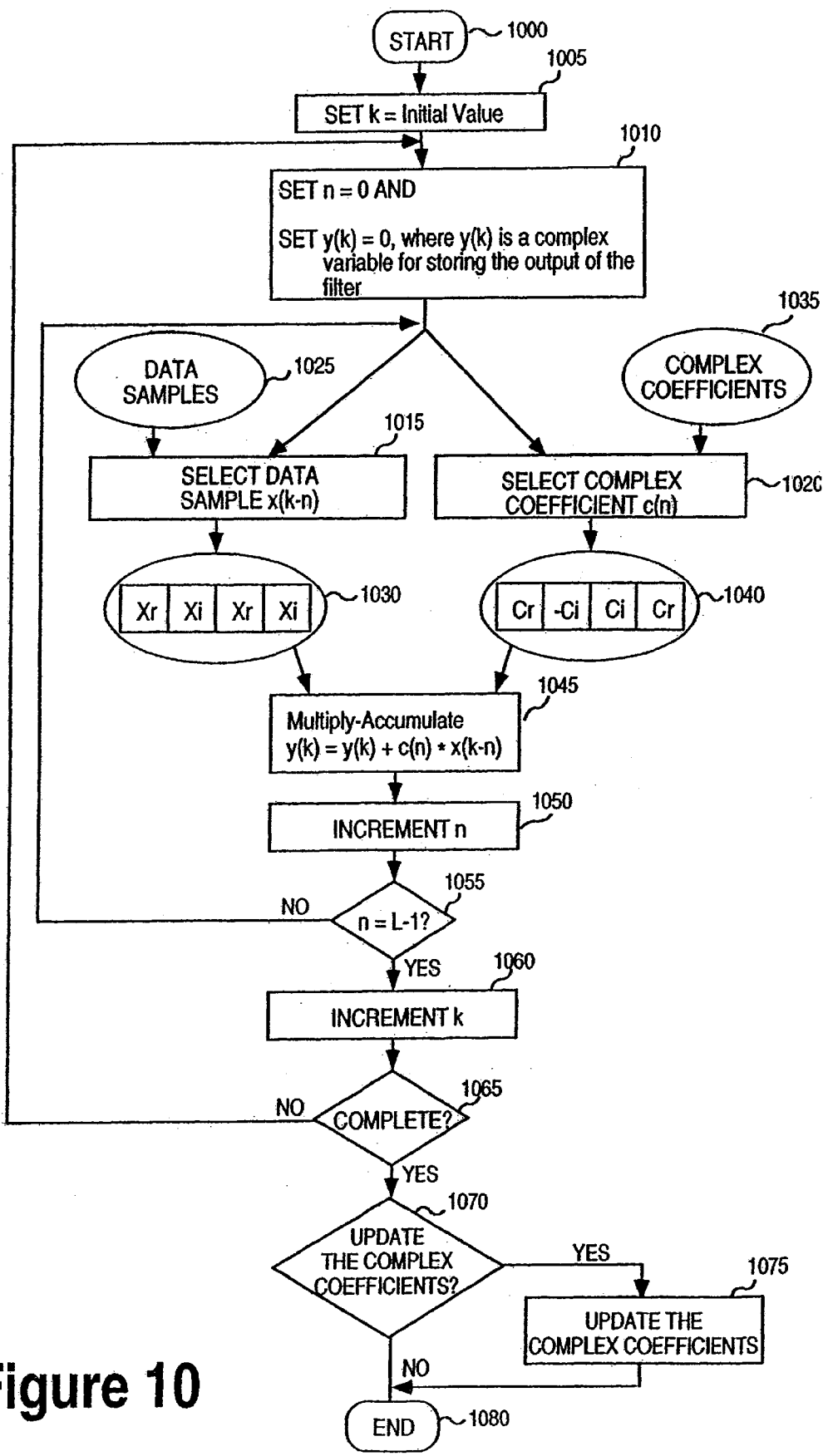
FIG. 10 illustrates a technique for performing a complex FIR filter according to one embodiment of the invention.

FIG. 10 illustrates a technique for performing a complex FIR filter according to one embodiment of the invention. The technique starts at step 1000. From step 1000, flow passes to step 1005.

At step 1005, the variable k is set to an initial value. As previously illustrated in Equation 3, k is the variable which determines which FIR filter output is being generated—y(k). The variable k represents the size of the block of data to be processed.

At step 1010, both variables n and y(k) are set equal to 0. As previously illustrated in Equation 3, the variable n is the counter for stepping through the complex coefficients and the variable y(k) stores the complex output of the FIR filter. The variable y(k) is stored as a packed data item having two 32-bit data elements. This step is the first step in the outer loop of the filter. From step 1010, flow passes to both steps 1015 and 1020. Steps 1015 and 1020 are the first steps in the inner loop of the FIR filter.

At step 1015, the data sample x(k−n) is selected from the data samples 1025. Typically, the data samples are received in real time, while the complex coefficients are predetermined. Since, in one embodiment, the first format (Ar, Ai, Ar, Ai) requires less processing to generate than the second format (Br, −Bi, Bi, Br), the data samples 1025 are stored in the first format and the complex coefficients are pre-computed and stored in the second format. The data samples 1025 may be placed in the described format in any manner, including those described above. For example, the data samples 1025 may be stored in the first format by simply replicating (storing two copies of) each complex value in memory during the data allocation phase. The selected data sample x(k−n) is represented by a current sample 1030. For purposes of illustrating this technique, the data elements stored in the current sample 1030 are represented by Xr, Xi, Xr, and Xi, respectively. Of course, each of the data samples 1025 may be either a complex number or a real number represented as a complex number.

At step 1020, the complex coefficient c(n) is selected from the complex coefficients 1035. As previously described with reference to one embodiment of the invention, the complex coefficients 1035 are stored in the second format described above (Br, −Bi, Bi, Br). The complex coefficients 1035 may be placed in the described format in any manner, including those described above. The selected complex coefficient x(k−n) is represented by a current coefficient 1040. For purposes of illustrating this technique, the data elements stored in the current coefficient 1040 are represented by Cr, −Ci, Ci, and Cr, respectively.

At step 1045, a multiply-accumulate operation is performed on the current sample 1030, current coefficient 1040, and y(k). Thus, the current sample 1030 is multiplied by the current coefficient 1040. The result of this multiplication is added to the previous complex accumulation value stored in complex variable y(k). This step is performed using a technique equivalent to that shown in FIG. 3 (e.g., using the PMADDwd and PADDd instructions). Thus, if the data elements of the variable y(k) were storing zero, the data elements now store XrCr−XiCi and XrCi+XiCr, respectively. Otherwise, the data elements now store the accumulated total of the previous real and imaginary component results, respectively. In this manner, the accumulation of the complex multiplication is stored. From step 1045, flow passes to step 1050.

At step 1050, the variable n is incremented and flow passes to step 1055.

At step 1055, it is determined whether n is equal to L−1. As previously illustrated in Equation 3, L is the number of complex coefficients. If n is equal to L−1, all of the complex coefficients have been processed and flow passes to step 1060. Otherwise, flow passes back to steps 1015 and 1020. This step is the end of the inner loop.

At step 1060, the variable k is incremented and flow passes to step 1065.

At step 1065, it is determined whether the outer loop is complete. If the outer loop is not complete, flow passes back to step 1010 for another pass of the inner loop. Otherwise, flow passes to step 1070.

Certain digital filters, referred to as adaptive filters, can alter the complex coefficients using well known techniques. The steps 1070 and 1075 shown in FIG. 10 are performed by such a filter. However, if an adaptive filter is not required, steps 1070 and 1075 are removed and flow passes from step 1065 to step 1080 where the technique ends.

At step 1070, it is determined whether the complex coefficients 1035 need to be updated. This determination is made using any number of well known techniques. If the complex coefficients 1035 need to be updated, flow passes to step 1075. Otherwise, flow passes to step 1080.

At step 1075, the complex coefficients 1035 are updated. From step 1075, flow passes to step 1080. The necessary updates are determined using any number of techniques, one of which is described with reference to FIG. 11. Of course, the complex coefficients are stored in a format that is conducive to efficient complex multiplication—e.g., (Br, −Bi, Bi, Br). As previously described, the complex coefficients can be put in this format using any technique, including the technique described with reference to FIG. 9.

In one embodiment, the processor 105 includes two pipelines, referred to herein as the U- and V-pipelines. Both the U- and the V-pipelines are capable of executing certain of the packed data instructions. In one embodiment, the U-pipeline executes the packed data instructions that require accesses to memory or register files other than those used to perform the packed data operations (e.g., MOVQ). A further description of this pipeline can be found in "A Method and Apparatus for Providing Operand Reads in Processor Pipelines", Ser. No. 08/575,780, Filed Dec. 20, 1995, by Orenstein et al. To maximize throughput of the computation flow of a complex digital filter routine, the instruction sequence may be scheduled properly to minimize data dependencies. A data dependency existing when the result of a first instruction is a source operand of a second instruction. Since there is a data dependency between the first and second instruction, execution of the second instruction cannot complete until the result of the first instruction is available. In one embodiment, such data dependencies can result in freezing the execution of the second instruction until the result of the first instruction is available. For example, in one embodiment, the PMADDwd instruction can be issued in one clock, but has a three clock latency before its results are available for use by a subsequent instruction. To avoid freezing the pipeline as a result of data dependencies associated with this latency, the technique of "software pipelining" may be applied. According to this technique, in the present example, instructions that do not depend on the first instruction are inserted between the first and second instructions. As a result, by the time the processor reaches the second instruction, execution of the first instruction has completed and its result is available.

Example code for a complex digital filter routine that is software pipelined for the described embodiment is included at the end of this description. The registers used for performing the packed data operations are referred to herein as mm0–mm7. The code also includes references to registers ebx, edi, and esi and instructions MOV, JNZ, and SUB (further description of these items may be found in *Pentium Processor's Users Manual - Volume 3*: Architecture and Programming Manual, 1994, available from Intel Corporation of Santa Clara, Calif.). While this code is written for one embodiment of the processor, alternative embodiments that have different instructions names or different instructions are still within the scope of the invention. In this code, a sufficient number of multiply-accumulate iterations are unrolled to minimize the overhead of the loop code. Then, for the duration of each PMADDwd operation stage, instructions related to the previous and next PMADDwd operation stage are issued that do not depend of the current PMAD-Dwd operation stage result. As a result of this software pipelining technique, a two clock throughput per complex multiply-accumulate operation can be achieved within the inner loop.

The data formats described above with reference to FIG. 10 are for illustrative purposes. Of course, the data samples and the coefficients may be stored in other formats which allow the complex multiplication to be performed in a single instruction. For example, alternative embodiments may store the complex coefficients in the first format and the data samples in the second format. In addition, this same technique may be used, with slight modification (e.g., different data formats), in conjunction with alternative embodiments of the processor which include variations of the multiply-add instruction (e.g., an instruction which performs one multiply-add and one multiply-subtract operation) and/or a multiply-subtract instruction.

In one embodiment, step 1075 from FIG. 10 is performed using a technique called complex least means square (LMS) update. This algorithm allows the filter coefficients to be adjusted automatically to varying conditions on the input signal. This is important for applications such as a modem data pump for echo cancellation or channel equalization. This algorithm uses error distance information of the current input data sample relative to the ideal mapping of the data signal as a means to adjust the filter coefficients. In this manner, the filter may be tuned for maximum performance. The equation for a complex LMS update routine is shown below as Equation 5.

$i=0, 1, \ldots N-1$ filter taps $$c(k+1)(i)=c(k)(i)+B^*E(k)^*x(k-i)'$$ Equation 5

Where: N=filter length c(k)(i)=complex filter coefficients at sample time 'k' x(k−i)'=complex conjugate input data samples at time 'k'

B=real update step size (determines rate of convergence)

E(k)=complex error distance at sample time 'k'

As in the case of the complex FIR filter example, the real and imaginary components can be calculated separately. The equations for the real and imaginary components are shown below as Equation 6.

$$c(k+1)(i).real=c(k)(i).real+B^*(E(k).real^*x(k-i).real+E(k).imag^*x(k-i).imag)$$

$$c(k+1)(i).imag=c(k)(i).imag+B^*(E(k).imag^*x(k-i).real-E(k).real^*x(k-i).imag)$$ Equation 6

Figure 11:
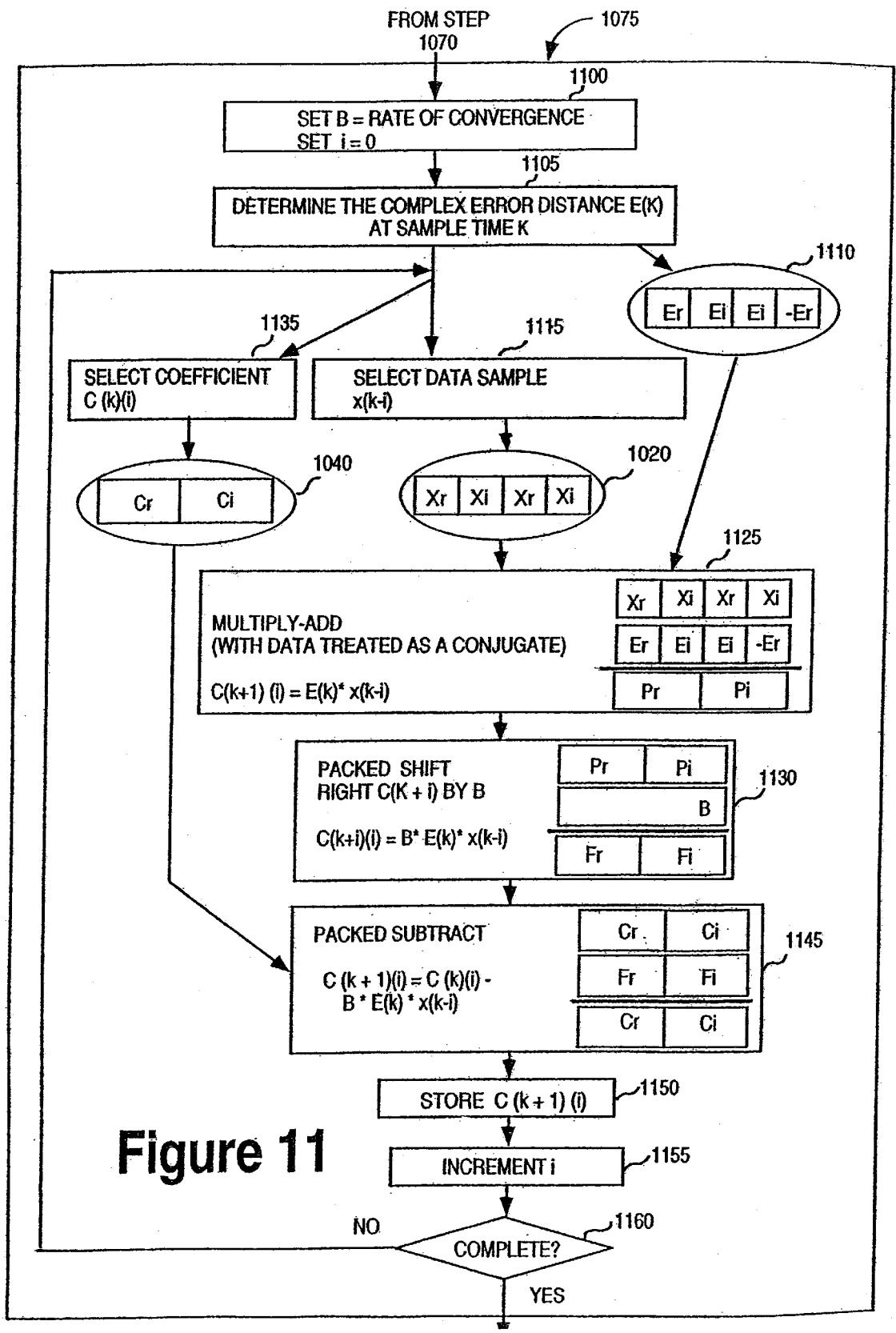
FIG. 11 illustrates the technique for updating the complex coefficients according to one embodiment of the invention.

FIG. 11 illustrates the technique for updating the complex coefficients (for performing step 1075 from FIG. 10) according to one embodiment of the invention. From step 1170, flow passes to step 1100.

At step 1100, the variable B is set to control the convergence rate of the filter coefficients towards the ideal values and the variable i is set to 0. Typically, B can be relatively small (i.e., $2^{-12}$), and thus the scaling can be represented by a right shift corresponding to the negative power of two of the magnitude. The variable i is a counter for stepping through the complex coefficients and the complex conjugate data samples. From step 100, flow passes to step 1105.

At step 1105, the complex error distance E(k) is determined for sample time k. The error distance E(k) is updated periodically as a result of previous processing using well known techniques. As shown in the above equation, the complex error distance E(k) and the complex conjugate of the data sample x(k−i)' must be multiplied together. As previously described, complex multiplication can be performed in response to a single multiply-add instruction if the data is properly formatted. In one embodiment, rather than generating the conjugate of the data samples, the error distance is stored in the format (Er, Ei, Ei, −Er) as shown in FIG. 11 by complex error distance 1110. Since the data samples are already stored in the format (Xr, Xi, Xr, Xi), execution of the multiply-add instructions result in E(k)*x (k−i)'. Generating the format (Er, Ei, Ei, −Er) can be performed using any number of techniques, including a variation of the technique shown in FIG. 9. Of course, alternative embodiments could store the data samples and error distance in a number of different formats to achieve the result. For example, an alternative embodiment could format all the data samples in the format (Xr, −Xi, Xr, −Xi) and the error distance in the format (Er, −Ei, Ei, Er). From step 1105, flow passes to steps 1115 and 1135.

In step 1115, the data sample x(k−i) is selected. Since the complex error distance E(k) is stored in the format (Er, Ei, Ei, −Er), the data samples x(k−i) are stored in the first format (Xr, Xi, Xr, Xi). The currently selected data sample x(k−i) is represented in FIG. 11 as the current data sample 1120. Typically, those data samples used to generate the current error distance are used.

At step 1125, the product of the current data sample 1120 and the complex error distance 1110 is generated using the multiply-add instruction. This step is performed using a technique equivalent to that shown if FIG. 3 (e.g., using the PMADDwd instruction). Thus, in one embodiment, the resulting packed data item contains two 32-bit data elements. These data elements are represented in FIG. 11 as Pr and Pi; The Pr representing the real component of the product E(k)*x(k−i)' (i.e., XrEr−XiEi), and the Pi representing the imaginary component of E(k)*x(k−i)' (i.e., XrEi+XiEr). From step 1125, flow passes to step 1130.

A step 1130, a packed shift right instruction is performed to generate B * E(k)*x(k−i)'. This packed shift right instruction is a packed shift right arithmetic double word instruction (PSRAd). The resulting 32-bit data elements of step 1130 are shown as Fr and Fi. From step 1130, flow passes to step 1145.

At step 1135, the complex coefficient c(k)(i) is selected. As previously described with reference to FIG. 10, in one embodiment the real and imaginary components of each complex coefficient are stored in a single packed data item. Each of these packed data items containing two 32-bit data elements, one for the real component and one for the imaginary component The selected complex coefficient c(k)(i) is represented by the current complex coefficient 1140. For purposes of illustrating this technique, the data elements stored in the current complex coefficient 1140 are represented by Cr and Ci, respectively.

At step 1145, a packed subtract instruction is performed on the current complex coefficient 1140 and the result of step 1130 to generate c(k)(i)−B *E(k) *x(k−i)'. The packed subtract instruction (PSUBd) operates in a similar manner to the packed add instruction described with reference to FIG. 6, except the respective data elements are subtracted rather than added. The result of this operation is stored in a single packed data item having two 32-bit data elements. For purposes of illustrating this technique, the data elements stored as a result of this step are represented by Cr' and Ci', respectively. These values represent the adjusted complex coefficient c(k+1)(i). From step 1145, flow passes the step 1150.

As shown is step 1150, the adjusted complex coefficient is stored in memory. From step 1150, flow passes step 1155.

At step 1155, the counter i is incremented and flow passes step 1160.

As shown in step 1160, it is determined if the loop is complete. If the loop is not complete, flow passes back to steps 1115 and 1135. Otherwise, flow passes to step 1080. The loop is complete when all of the complex coefficients have been processed.

While the complex LMS update flow described with reference to FIG. 11 used 32-bits for the complex coefficients and 16-bits for the error terms and data samples, the LMS update flow may be performed using values containing different numbers of bits. However, it is sometimes necessary to represent the complex coefficients using 32-bits (rather than 16-bits) to maintain enough cumulative accuracy as the coefficients get adjusted periodical by the LMS update algorithm. If the adjusted coefficients are to be used in their 16-bit format as described with reference to one embodiment of the digital filter shown in FIG. 10, the complex LMS update routine may need to format a second image of the coefficients (a copy of the coefficients stored in a 32-bit format) for storage in a packed data form conducive for the LMS update routine—i.e., one copy of the coefficients is stored in the 16-bit format for the digital filter, while another copy is stored in the 32-bit format for the LMS update routine. In the typical case where the adaptive filter rate occurs at lower frequency than the filter sample rate, it is computationally more efficient to update the 16-bit format coefficients when the 32-bit formats are updated. Of course, alternative embodiments could use the 16-bit format and adjust the values generated by step 1130.

As a result of the complex multiplication E(k) *x(k−i)' operation, an implicit shift may occur in both data elements (e.g., Pr and Pi). Thus, it is more accurate to shift Pr and Pi to correct for this implied shift. Rather than including another shift operation, embodiments may adjust the shift count value B used in the arithmetic shift right instruction to compensate.

As previously described, one embodiment the processor 105 includes two pipelines (the U- and V-pipelines). Both the U- and the V-pipelines are capable executing certain of the packed data instructions. However, in one embodiment, only the U-pipeline is capable of executing packed data instructions that require accesses to memory or register flies other than those used to perform the packed data operations (e.g., MOVQ). To maximize throughput of the computation flow of a LMS routine, the instruction sequence may be scheduled properly to minimize data dependencies. To establish a framework for how the instructions may be scheduled, it is useful to first breakdown the number and type of operations that are required per iteration. Table 2 below shows such a break down for one embodiment of a LMS update routine for execution on the processor 105.

TABLE 2

| Operation | Instruction | Restriction(s) |
| --- | --- | --- |
| Load data sample | MOVQ | U-pipeline only |
| Load coefficient | MOVQ | U-pipeline only |
| Multiply | PMADDwd | 1 per clock |
| Arithmetic shift right | PSRAd | 1 per clock |
| Subtract | PSUBd | none |
| Store coefficient | MOVQ | U-pipeline only |

Since, in one embodiment, there are six instructions required per iteration and the three MOVQ instructions must be scheduled in the U-pipeline, Table 2 implies that PMADDwd, PSRAd, and PSUBd must all be scheduled in the V-pipeline in order to achieve a maximum throughput of three clocks per iteration. Since, in one embodiment, the PMADDwd instruction has a three clock latency, successive iterations of the coefficient calculations can be overlapped to avoid a data dependency. Thus, similar software pipelining techniques may be used as described with reference to the digital filter. Example code for a complex LMS routine that is software pipelined for the described embodiment is included at the end of this description.

The data formats described above with reference to FIG. 11 are for illustrative purposes. Of course, the data samples and the complex error distance may be stored in other formats which allow the complex multiplication to be performed in a single instruction. In addition, this same technique may be used, with slight modification (e.g., different data formats), in conjunction with alternative embodiments of the processor which include variations of the multiply-add instruction (e.g., an instruction which performs one multiply-add and one multiply-subtract operation) and/or a multiply-subtract instruction.

Figure 12A:
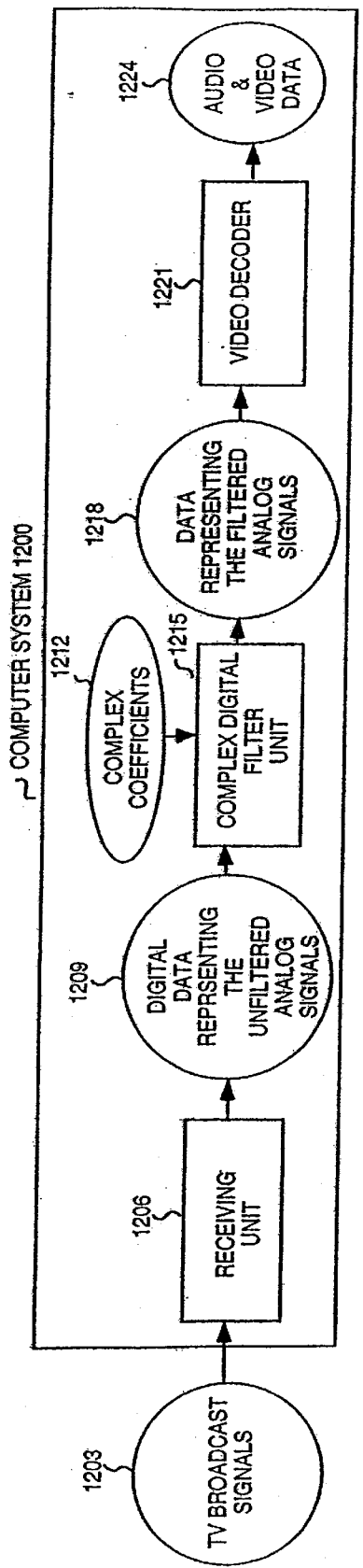
FIG. 12A is a general block diagram illustrating the use of a digital filter for ghost canceling a TV broadcast signal according to one embodiment of the invention.

FIG. 12A is a general block diagram illustrating the use of a digital filter for ghost canceling a TV broadcast signal according to one embodiment of the invention. FIG. 12A shows TV broadcast signals 1203 representing a television broadcast being received by a receiving unit 1206 of a computer system 1200. The receiving unit 1206 receives the TV broadcast signals 1203 and transforms them into digital data 1209. A complex digital filter unit 1215 performs a complex digital filter (e.g., FIR, IIR, etc.) on the digital data 1209 using a set of complex coefficients 1212. As a result, the complex digital filter unit 1215 generates filtered data 1218 (also termed as "filtered data items") representing the filtered analog TV broadcast signals. In this manner, ghost canceling is performed. The filtered data 1218 is received by a video decoder 1221 for conversion into and audio & video data 1224. The techniques performed by video decoder 1221 are well known (see Jack, Keith, "NTSC/PAL Digital Decoder", *Video Demystified,* High Text Publications, Inc. 1993.) The audio and video data can be used for any purpose (e.g., display on a screen).

In one embodiment, the computer system 100 shown in FIG. 1 is used to implement the computer system 1200 in FIG. 12A. In this embodiment, the TV broadcast signal receiver 131 acts as the receiving unit 1206 and may include a TV tuner, an analog to digital converter, and a DMA channel. The TV broadcast signals 1203 are received by the TV tuner, converted into digital data by the analog to digital converter, and then stored in the storage device 110 by the DMA channel. Of course, the digital data stored by the TV broadcast signal receiver 131 may be stored in any number of formats. For example, the TV broadcast signal receiver 131 may store the data in the main memory in one or more of the formats described herein—storing two representations of each of the components of the data such that it may be read in as packed data item in the described formats. This data may then be accessed as packed data and copied into registers on the processor 105. Since the data is stored in the disclosed formats, the processor 105 can easily and efficiently perform the complex multiplication as described with reference to FIG. 3. Although these formats for storing complex numbers require more storage space, the performance advantage for complex multiplication is worth the additional storage space in some situations. Of course, the receiving unit 1206 may encompass additional hardware, software, and or firmware in the TV broadcast signal receiver 131 or software executing on the processor 105. For example, additional software may be stored in the storage device 110 for further processing the data prior to the complex digital filter being performed.

In this embodiment, the complex digital filter unit 1215 is implemented using the processor 105 and the software 136 to perform the a complex digital filter similar to that described with reference to FIG. 10. In this embodiment, the processor 105, executing the software 136, performs the complex digital filter and stores the filtered data 1218 in storage device 110. In this manner, the complex digital filter is performed by the host processor of the computer system, rather than the TV broadcast signal receiver 131. As a result, the complexity of the TV broadcast signal receiver 131 is reduced. In this embodiment, the video decoder 1221 may be implemented in any number of different combinations of hardware, software, and/or firmware. The audio and video data 1224 can then be stored, and/or displayed on the display 125 and the sound unit 134, respectively.

Figure 12B:
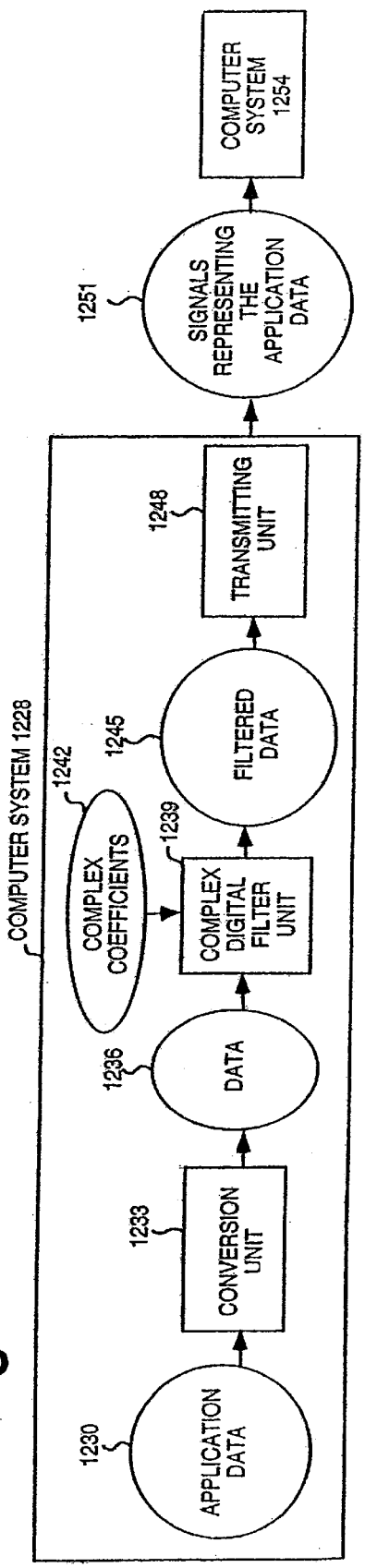
FIG. 12B is a general block diagram illustrating the use of a digital filter for transmitting data to another computer according to one embodiment of the invention.

FIG. 12B is a general block diagram illustrating the use of a complex digital filter for transmitting data using a modem according to one embodiment of the invention. FIG. 12B shows a computer system 1228 transmitting application data 1230 to a computer system 1254 over a modem connection. The application data 1230 is accessed by a conversion unit 1233 for conversion into unfiltered data items 1236. The techniques performed by conversion unit 1233 may include, for example, DTE, data compression, error correction, HDLC framing, scrambling, trellis encoding, and complex mapping. A complex digital filter unit 1239 performs a complex digital filter (e.g., FIR, IIR, etc.) on the unfiltered data items 1236 using a set of complex coefficients 1242. As a result, the complex digital filter unit 1239 generates a data stream represented by filtered data 1245 (also termed as "filtered data items"). The filtered data 1245 is received by a transmitting unit 1248 for transmission to computer system 1254. The transmitting unit 1248 transforms the filtered data 1245 into signals 1251 representing the application data 1230. Since the filtered data 1245 may be further manipulated, the signals 1251 are said to be generated based on (also termed as "associated with") the filtered data 1245. The transmitting unit 1248 transmits the signals 1251 to the computer system 1254. Techniques performed by the transmitting unit 1248 include, for example, modulation and digital to analog conversion. The signals 1251 are received by the computer system 1254 and eventually converted back into the application data 1230.

In one embodiment, the computer system 100 shown in FIG. 1 is used to implement the computer system 1228 in FIG. 12B. In this embodiment, the application data 1230 is any data stored in storage device 110 that is to be transmitted to another computer system. The conversion unit 1233 may be implemented using any number of combinations of hardware, software, and/or firmware. In one embodiment, the conversion unit 1220 from FIG. 12B is implemented using software executing on processor 105 from FIG. 1. In addition, the complex digital filter unit 1239 is implemented using the processor 105 and the software 136 to perform a complex digital filter similar to that described with reference to FIG. 10. In this embodiment, the processor 105, executing the software 136, performs the complex digital filter and stores the resulting data stream as the filtered data 1245 in storage device 110. In this manner, the complex digital filter is performed by the host processor of the computer system, rather than the fax/modem 132 coupled to bus 115. As a result, the complexity of the fax/modem 132 is reduced. The transmitting unit 1248 may be implemented in computer system 100 using any number of different hardware, software, and/or firmware combination. However, in one embodiment, the transmitting unit 1248 is implemented using hardware, firmware, and/or software in the fax/modem 132 of FIG. 1. Thus, the fax/modem 132 transmits the analog signals associated with the filtered data to another computer system.

Figure 12C:
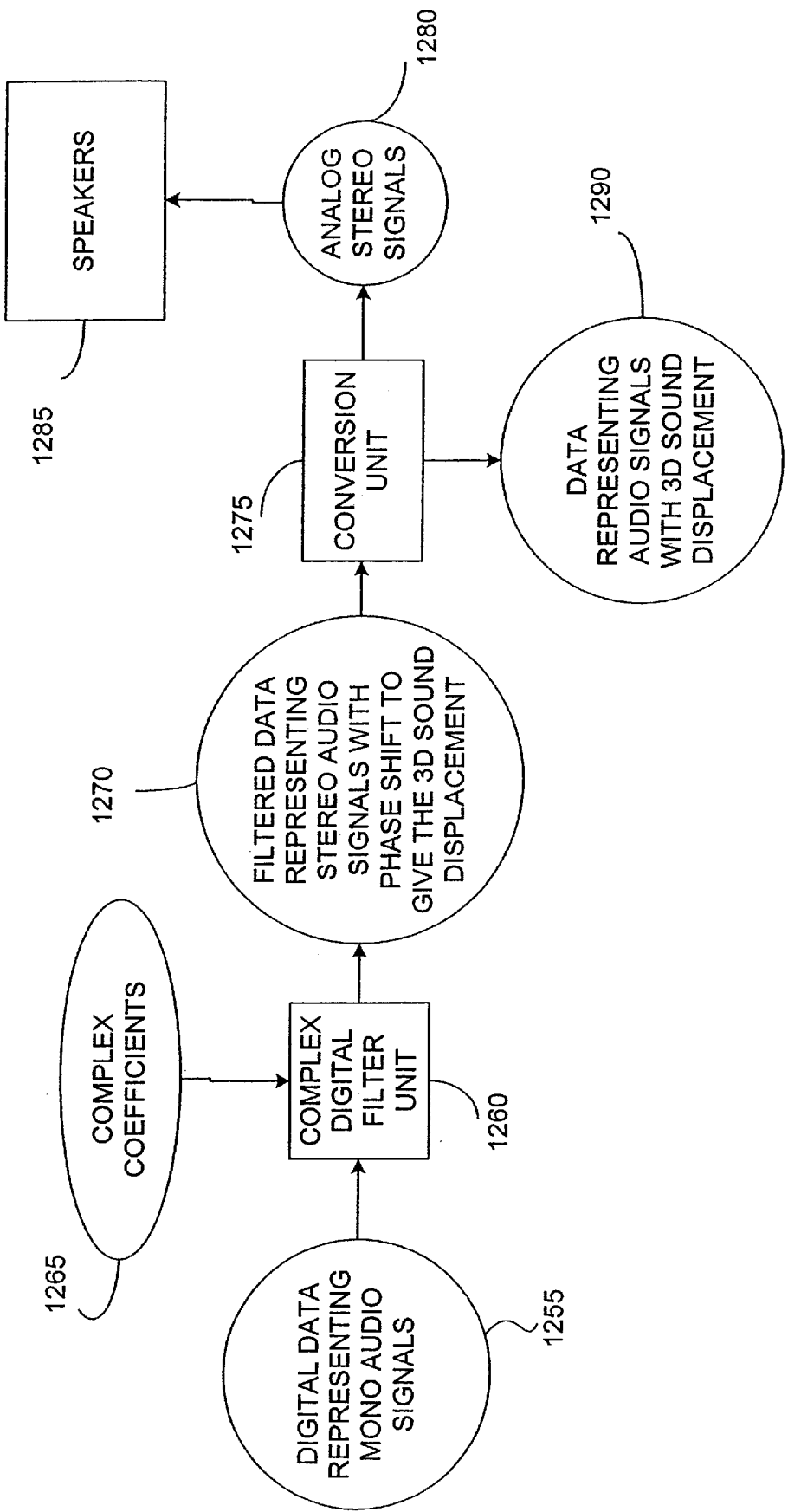
FIG. 12C is a general block diagram illustrating the use of a digital filter for transforming mono audio into stereo audio with phase shift according to one embodiment of the invention.

FIG. 12C is a general block diagram illustrating the use of a complex digital filter for transforming mono audio into stereo audio with phase shift according to one embodiment of the invention. FIG. 12C shows a computer system 1295 containing digital data 1255 representing mono audio signals. The mono signal represented by the digital data 1255 may be generated by sampling a real sound or it may be synthesized. The mono signal and/or the data representing it may be compressed, decompressed, mixed, cleaned, etc. Once generated, the digital data 1255 may be store on a CD ROM or other type of storage device for later use. At sometime, the complex digital filter unit 1260 performs a complex digital filter (e.g., FIR, IER, etc.) on the digital data 1255 using a set of complex coefficients 1265 to generate a data stream represented by filtered data 1270. In the complex digital filter, the amplitudes and phases of the sounds are adjusted to give the sounds 3 D displacement. The filtered data 1270 is accessed/received by the conversion unit 1275 for conversion into analog stereo signals 1280 or for conversion into data 1290 representing the analog stereo signals. The techniques performed by the conversion unit 1275 include, for example, compression, conversion into real data, amplification, digital to analog conversion, etc. Since the filtered data 1270 may be further manipulated by the conversion unit 1275, the analog stereo signals 1280 are said to be generated based on (also termed "associated with") the filtered data 1270. The analog stereo signals 1280 may be transmitted by conversion unit 1275 to one or more speakers 1285. The speakers 1285 convert the analog stereo signals into sound waves. On the other hand, the analog stereo signals may be transmitted to a recording device (e.g., magnetic storage, such as a tape). In contrast, the digital data representing the analog stereo signals 1280 may be stored in a storage device (e.g., magnetic, optical, etc.) for later use.

In one embodiment, the computer system 100 shown in FIG. 1 is used to implement the computer system 1295 from FIG. 12C. In this embodiment, the digital data 1255 from FIG. 12B is any data stored in the storage device 110 representing mono audio. In one embodiment, the complex digital filter unit 1260 from FIG. 12B is implemented using the processor 105 and the software 136 to perform a complex digital filter-similar to that described with reference to FIG. 10. In this embodiment, the processor 105, executing the software 136, performs the complex digital filter and stores the filtered data 1270 in the storage device 110. In this manner, the complex digital filter is performed by the host processor of the computer system, rather than the sound unit 134 coupled to the bus 115. As a result, the complexity of the sound unit 134 is reduced. The conversion unit 1275 from FIG. 12C may be implemented using any number of different combination of hardware, software, and/or firmware in FIG. 1. Thus, the conversion unit 1275 may be implemented in the computer system 100 using software for execution on the processor 105 and/or hardware, software, and/or firmware in the sound unit 134. In one embodiment, the sound unit 134 also includes speakers to perform the function of the speakers 1285 from FIG. 12C. One application of this digital filter is in video simulations. The 3-dimensional sound displacement may be used to properly orient the sound with reference to the relative location of the item in the simulation that is generating it.

While several example uses of complex digital filters have been described, it is to understood that the invention is not limited to these uses. In addition, while the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

EXAMPLE CODE
Complex FIR filter code example

```
;mm0-mm3    used as for scratch registers
;mm4        Filter accumulator
;ebx        inner loop iteration count
;edi        input data pointer
;esi        coefficient pointer
;
;Code is shown below in 2 columns to illustrate how the code is scheduled
;in the U & V pipes.
;
;U-pipe                          V-pipe
;
;initialize pointers and loop count
MOV         esi,COEFF_ADDR      MOV     ebx,(FSIZE-2)*8
MOV         edi,DATAIN_ADDR
;
;unrolled header code that primes the inner loop
MOVQ        mm0,[ebx+esi]       PXOR    mm4,mm4         ;read C0         :clear acc
PMADDwd     mm0,[ebx+edi]                               ;mm0=C0*D0
MOVQ        mm1,[ebx+esi+8]                             ;read C1
PMADDwd     mm1,[ebx+edi+8]                             ;mm1=C1*D1
;
;Unrolled code inner loop code
INNERLOOP:
MOVQ        mm2,[ebx+esi+16]    PSRAd   mm0,1           ;read C2         :C0*D0 >> 1
PMADDwd     mm2,[ebx+edi+16]    PADDd   mm4,mm0         ;mm2=C2*D2       :mm4+=C0*D0
MOVQ        mm3,[ebx+esi+24]    PSRAd   mm1,1           ;read C3         :C1*D1 >> 1
PMADDwd     mm3,[ebx+edi+24]    PADDd   mm4,mm1         ;mm3=C3*D3       :mm4+=C1*D1
MOVQ        mm0,[ebx+esi+32]    PSRAd   mm2,1           ;read C4         :C2*D2 >> 1
PMADDwd     mm0,[ebx+edi+32]    PADDd   mm4,mm2         ;mm0=C4*D4       :mm4+=C2*D2
MOVQ        mm1,[ebx+esi+40]    PSRAd   mm3,1           ;read C5         :C3*D3 >> 1
PMADDwd     mm1,[ebx+edi+40]    PADDd   mm4,mm3         ;mm1=C5*D5       :mm4+=C3*D3
SUB         ebx,32              JNZ     INNERLOOP       ;loop thru entire filter
;
;unrolled tail code outside of inner loop
PSRAd       mm0,1                                       ;C4*D4 >> 1
PADDd       mm4,mm0             PSRAd   mm1,1           ;mm4+=C4*C4      :C5*D5 >> 1
PADDd       mm4,mm1                                     ;mm4+=C5*D5
;
;format and store the accumulator
PSRAd       mm4,14              MOV     eax,DATAOUT_ADDR    ;shift dword down
PACKSSdw    mm4,mm4                                     ;pack to word format
MOVQ        [eax],mm4                                   ;store filter output
;end
```

| Complex LMS update code example |
|---|

```
;Coefficient format (double precision): C.r: C.i
;Data sample format:       D.r : D.i : D.r : D.i
;Error value format:       E.r : E.i : E.i : –E.r
;
;mm0–mm3        used as for scratch registers
;mm4            Packed error value
;mm5            Update step size (B)
;mm6            Temporary coefficient operand
;ebx            inner loop iteration count
;edi            sample data pointer
;esi            coefficient pointer
;
;Code is shown below in 2 columns to illustrate how the code is scheduled
;in the U & V pipes.
;
;U-pipe                            V-pipe
;
;initialize pointers and loop count
MOV       edi,DATAIN_ADDR    MOV       ebx,(FSIZE-2)*8
MOV       esi,COEFF_ADDR
;
;unrolled header code that primes the inner loop
MOVQ      mm0,[ebx+edi]                              ;read D0
PMADDwd   mm0,mm4                                    ;mm0=D0*E(k)
MOVQ      mm1,[ebx+edi+8]                            ;readD1
PMADDwd   mm1,mm4                                    ;mm1=D1*E(k)
;
;Unrolled code inner loop code
INNERLOOP:
MOVQ      mm6,[ebx+esi]      PSRAd     mm0,mm5   ;read C0    :D0*E(k)>>B
MOVQ      mm2,[ebx+edi+16]   PSUBd     mm6,mm0   ;read D2    :C0-="
MOVQ      [ebx+esi],mm6      PMADDwd   mm2,mm4   ;store C0'  :mm2=D2*E(k)
MOVQ      mm6,[ebx+esi+8]    PSRAd     mm1,mm5   ;read C1    :D1*E(k)>>B
MOVQ      mm3,[ebx+edi+24]   PSUBd     mm6,mm1   ;read D3    :C1-="
MOVQ      [ebx+esi+8],mm6    PMADDwd   mm3,mm4   ;store C1'  :mm3=D3*E(k)
MOVQ      mm6,[ebx+esi+16]   PSRAd     mm2,mm5   ;read C2    :D2*E(k)>>B
MOVQ      mm0,[ebx+edi+32]   PSUBd     mm6,mm2   ;read D4    :C2-="
MOVQ      [ebx+esi+16],mm6   PMADDwd   mm0,mm4   ;store C2'  :mm0=D4*E(k)
MOVQ      mm6,[ebx+esi+24]   PSRAd     mm3,mm5   ;read C3    :D3*E(k)>>B
MOVQ      mm1,[ebx+edi+40]   PSUBd     mm6,mm3   ;read D5    :C3-="
MOVQ      [ebx+esi+24],mm6   PMADDwd   mm1,mm4   ;store C3'  :mm1=D5*E(k)
SUB       ebx,32             JNZ       INNERLOOP ;loop thru entire filter
;
;unrolled tail code outside of inner loop
MOVQ      mm6,[ebx+esi+32]   PSRAd     mm0,mm5   ;read C4    :D4*E(k)>>B
MOVQ      mm7,[ebx+esi+40]   PSUBd     mm6,mm0   ;read C5    :C4-="
MOVQ      [ebx+esi+32],mm6   PSRAd     mm1,mm5   ;store C4'  :D5*E(k)>>B
PSUBd     mm7,mm1                                ;C5-=          "
MOVQ      [ebx+esi+40],mm7                       ;store C5'
;
;end
```

What is claimed is:

1. A computer-implemented method for multiplying and accumulating data samples and complex coefficients when performing a complex digital filter, said method comprising:

A) receiving a single instruction identifying packed data operands having stored therein at least eight data elements, a first subset of said eight data elements including two representations of each component of a complex coefficient, a second subset of said eight data elements including two representations of each component of a corresponding data sample;

B) executing said single instruction, said executing comprising,

B1) reading said eight data elements, and

B2) generating a currently calculated complex number representing a product of said complex coefficient and corresponding data sample using said first and second subsets; and C) respectively adding a real component and an imaginary component of said currently calculated complex number to a first data element and a second data element of an accumulation packed data item.

2. The computer-implemented method of claim 1, further comprising:

D) shifting both said first and second data elements of said accumulation packed data item to the right by N bits.

3. The computer-implemented method of claim 1, wherein each of said eight data elements is represented by N bits, and the components of said currently calculated complex number are represented by 2N bits.

4. The computer-implemented method of claim 1, wherein only a first data element in said eight data elements is negative.

5. The computer-implemented method of claim 4, wherein said first data element of said eight data elements represents either a real component or an imaginary component of said complex coefficient.

6. The computer-implemented method of claim 4, wherein said adding is performed in response to executing another single instruction.

7. The computer-implemented method of claim 4, wherein there are a plurality of sets of corresponding relationships between the complex coefficients and the data samples, and wherein the method further comprises:

for each of the plurality of sets of corresponding relationships, generating one accumulation packed data item by performing A, B, and C for each complex coefficient according to the corresponding relationship of the set.

8. The method of claim 1, wherein, said first subset of said eight data elements is stored within a first packed data operand and said second subset of said eight data elements is stored within a second packed data operand.

9. A machine-readable medium having stored thereon data representing sequences of instructions, said sequences of instructions which, when executed by a processor, cause said processor to multiply and accumulate data samples and complex coefficients as part of a complex digital filter by causing said processor to perform the following:

A) receiving a single instruction identifying packed data operands having stored therein at least eight data elements, a first subset of said eight data elements including two representations of each component of a complex coefficient, a second subset of said eight data elements including two representations of each component of a corresponding data sample;

B) executing said single instruction, said executing comprising,

B1) reading said eight data elements, and

B2) generating a currently calculated complex number representing a product of said complex coefficient and corresponding data sample using said first and second subsets; and C) respectively adding a real component and an imaginary component of said currently calculated complex number to a first data element and a second data element of an accumulation packed data item.

10. The machine-readable medium of claim 9, wherein said sequences of instructions, when executed by said processor, further cause said processor to perform the following:

D) shifting both said first and second data elements of said accumulation packed data item to the right by N bits.

11. The machine-readable medium of claim 9, wherein each of said eight data elements is represented by N bits, and the components of said currently calculated complex number are represented by 2N bits.

12. The machine-readable medium of claim 9, wherein all of said eight data elements are positive.

13. The machine-readable medium of claim 9, wherein only a first data element in said eight data elements is negative.

14. The machine-readable medium of claim 13, wherein said first data element of said eight data elements represents either a real component or an imaginary component of said corresponding data sample.

15. The machine-readable medium of claim 13, wherein said first data element of said eight data elements represents either a real component or an imaginary component of said complex coefficient.

16. The machine-readable medium of claim 9, wherein said adding is performed in response to executing another single instruction.

17. The machine-readable medium of claim 9, wherein there are a plurality of sets of corresponding relationships between the complex coefficients and the data samples, and wherein said sequences of instructions, when executed by said processor, further cause said processor to perform the following:

for each of the plurality of sets of corresponding relationships, generating one accumulation packed data item by performing A, B, and C for each complex coefficient according to the corresponding relationship of the set.

18. The machine-readable medium of claim 9, wherein, said first subset of said eight data elements is stored within a first packed data operand and said second subset of said eight data elements is stored within a second packed data operand.

* * * * *

UNITED STATES PATENT AND TRADEMARK OFFICE
CERTIFICATE OF CORRECTION

PATENT NO. : 6,237,016 B1
DATED : May 22, 2001
INVENTOR(S) : Fischer et al.

It is certified that error appears in the above-identified patent and that said Letters Patent is hereby corrected as shown below:

Column 10,
Line 8, delete "maimer", insert -- manner --.

Column 12,
Line 53, delete "Alterative", insert -- Alternative --.

Column 17,
Line 55, delete "step 100", insert -- step 1100 --.

Column 19,
Line 4, delete "periodical", insert -- periodically --.

Column 22,
Line 4, delete "IER", insert -- IIR --.

Column 27,
Line 8, delete "claim 1", insert -- claim 9 --.

Signed and Sealed this

Fifth Day of November, 2002

Attest:

JAMES E. ROGAN
Attesting Officer    Director of the United States Patent and Trademark Office